US011122917B2

(12) United States Patent
Chapuis et al.

(10) Patent No.: US 11,122,917 B2
(45) Date of Patent: Sep. 21, 2021

(54) ADJUSTABLE APPARATUSES THAT SECURE LAPTOP COMPUTERS TO DISPLAY TABLES

(71) Applicant: OnQ Solutions, Inc., Hayward, CA (US)

(72) Inventors: Paul F. Chapuis, Woodside, CA (US); Steven D. Penny, Oakland, CA (US); Thomas M. Hopmans, Davis, CA (US); William B. Tenney, Hayward, CA (US); Sean A. Nazerad, San Jose, CA (US)

(73) Assignee: OnQ Solutions, Inc., Hayward, CA (US)

( * ) Notice: Subject to any disclaimer, the term of this patent is extended or adjusted under 35 U.S.C. 154(b) by 103 days.

(21) Appl. No.: 16/572,296

(22) Filed: Sep. 16, 2019

(65) Prior Publication Data

US 2021/0059437 A1    Mar. 4, 2021

Related U.S. Application Data

(60) Provisional application No. 62/894,253, filed on Aug. 30, 2019.

(51) Int. Cl.
*A47F 7/024* (2006.01)
*E05B 73/00* (2006.01)
(Continued)

(52) U.S. Cl.
CPC .............. *A47F 7/0246* (2013.01); *A47F 5/10* (2013.01); *E05B 73/0082* (2013.01);
(Continued)

(58) Field of Classification Search
CPC ...... A47F 7/0246; A47F 5/10; E05B 73/0082; F16M 11/04; F16M 13/02; F16M 2200/02
See application file for complete search history.

(56) References Cited

U.S. PATENT DOCUMENTS 6,700,488 B1   3/2004   Leyden et al.
7,187,283 B2   3/2007   Leyden et al.
(Continued)

FOREIGN PATENT DOCUMENTS

WO    WO2019/213490 A1   11/2019

OTHER PUBLICATIONS

Gripzo, "iPad Enclosure", https://www.gripzo.com/en/products/tablets/ipad-enclosure, downloaded on Jun. 11, 2018.
(Continued)

*Primary Examiner* — Anita M King
(74) *Attorney, Agent, or Firm* — Vierra Magen Marcus LLP

(57) ABSTRACT

Apparatuses for physically securing a laptop in an open position to a tabletop of a display table or to another display surface are disclosed. In an embodiment an apparatus includes a main body and left, right, and front arms that are extendable and retractable relative to the main body. Left, right, and front side braces are attached respectively to the left, right, and front arms, and are configured to be secured to left, right, and front sides, respectively, of a lower body portion of a laptop. Fasteners extend downward from the main body and are attachable to a tabletop or to another display surface. A lock mechanism can automatically lock the arms in place after they have been at least partially retracted to secure a lower body portion of a laptop to the main body. Releasing the lock mechanism can cause the arms automatically to return to fully extended positions.

22 Claims, 14 Drawing Sheets

(51) Int. Cl.
*A47F 5/10* (2006.01)
*F16M 11/04* (2006.01)
*F16M 13/02* (2006.01)

(52) U.S. Cl.
CPC ............ *F16M 11/04* (2013.01); *F16M 13/02* (2013.01); *F16M 2200/02* (2013.01)

(56) References Cited

U.S. PATENT DOCUMENTS

| | | | |
|---|---|---|---|
| 7,967,269 B2* | 6/2011 | Liu | G03B 21/58 |
| | | | 248/287.1 |
| 8,061,164 B2 | 11/2011 | Johnston et al. | |
| 8,191,851 B2 | 6/2012 | Crown | |
| 8,240,628 B2* | 8/2012 | Huang | F16M 13/00 |
| | | | 248/316.1 |
| 8,360,373 B2 | 1/2013 | Johnson et al. | |
| 8,701,452 B2 | 4/2014 | Foster et al. | |
| 8,814,128 B2 | 8/2014 | Trinh et al. | |
| 8,833,716 B2* | 9/2014 | Funk | F16M 13/022 |
| | | | 248/316.4 |
| 8,864,089 B2 | 10/2014 | Hung | |
| 8,925,886 B2 | 1/2015 | Sears | |
| 8,985,544 B1 | 3/2015 | Gulick, Jr. | |
| 8,998,048 B1 | 4/2015 | Wu | |
| 9,022,337 B2 | 5/2015 | Petruskavich | |
| 9,039,785 B2 | 5/2015 | Gulick, Jr. | |
| 9,097,380 B2 | 8/2015 | Wheeler | |
| 9,117,351 B2 | 8/2015 | Gulick, Jr. et al. | |
| 9,159,309 B2 | 10/2015 | Liu et al. | |
| 9,161,466 B2 | 10/2015 | Huang | |
| 9,568,141 B1 | 2/2017 | Zaloom | |
| 9,714,528 B2 | 7/2017 | Van Balen | |
| 9,797,543 B2* | 10/2017 | Lin | E05B 73/0082 |
| 9,936,823 B2 | 4/2018 | Galant | |
| 10,165,873 B2 | 1/2019 | Gulick, Jr. et al. | |
| 10,323,440 B1 | 6/2019 | Kelsch et al. | |
| 10,378,248 B1 | 8/2019 | Kelsch et al. | |
| 10,925,414 B2* | 2/2021 | Gulick, Jr. | A47F 7/0246 |
| 2010/0108828 A1 | 5/2010 | Yu et al. | |
| 2010/0148030 A1 | 6/2010 | Lin | |
| 2011/0133050 A1* | 6/2011 | Eisenberger, Sr. | F16M 13/00 |
| | | | 248/551 |
| 2012/0037783 A1 | 2/2012 | Alexander et al. | |
| 2012/0234055 A1 | 9/2012 | Bland, III et al. | |
| 2013/0301216 A1 | 11/2013 | Trinh et al. | |
| 2013/0318639 A1 | 11/2013 | Gulick, Jr. | |
| 2014/0060218 A1 | 3/2014 | Bisesti et al. | |
| 2014/0263931 A1* | 9/2014 | Chen | F16M 13/00 |
| | | | 248/576 |
| 2015/0089675 A1 | 3/2015 | Gulick, Jr. | |
| 2015/0108948 A1 | 4/2015 | Gulick, Jr. et al. | |
| 2015/0196140 A1 | 7/2015 | Lin | |
| 2015/0300050 A1 | 10/2015 | Van Balen | |
| 2017/0049251 A1 | 2/2017 | Gulick, Jr. et al. | |
| 2017/0188724 A1 | 7/2017 | Lin | |
| 2018/0058107 A1 | 3/2018 | Lucas et al. | |
| 2019/0316386 A1 | 10/2019 | Gulick, Jr. et al. | |

OTHER PUBLICATIONS

Gripzo, "iPhone", https://www.gripzo.com/en/products/smartphones/iphone, downloaded on Jun. 11, 2018.

Scorpion Security Products, "4-Point ERS Phone Scorpion", https://www.scorpionsecurityproducts.com/product/4-point-ers-phone-scorpion/, downloaded on Jun. 11, 2018.

Scorpion Security Products, "4-Point ERS Small Tablet Scorpion", https://www.scorpionsecurityproducts.com/product/4-point-ers-small-tablet-scorpion/, downloaded on Jun. 11, 2018.

Dongguan Comer Electronic Technology Co., Ltd., "Comer Anti-Theft Locking Laptop Mechanical Security Display Frame For Mobile Phone Stores", http://www.comerdisplay.com/sale-8024631-comer-anti-theft-locking-laptop-mechanical-security-display-frame-for-mobile-phone-stores.html, downloaded on Jun. 11, 2018.

Dongguan Comer Electronic Technology Co., Ltd., "COMER Universal Display Mechanical Anti-Theft Security Display Locking System For Tablet Brackets", http://www.smartcomer.com/sale-8028445-comer-universal-display-mechanical-anti-theft-security-display-locking-system-for-tablet-brackets.html, downloaded on Jun. 11, 2018.

RTF, "Vise—Securely And Attractively Placing Your Product First", http://www.rtfglobal.com/products/vise-cell-phone-security/, downloaded on Jun. 11, 2018.

RTF, "Smartphones—Samsung Note 3, LG Flex, HTC One, Apple iPhone 5, Blackberry Z10", http://www.rtfglobal.com/solutions/by-devices-type/smartphones/#!prettyPhoto, downloaded on Jun. 11, 2018.

Gripzo, "Universal Smartphone Grip/ Universal Tablet Grip", https://www.gripzo.com/en/products/smartphones/iphone, downloaded on Jun. 14, 2018.

* cited by examiner

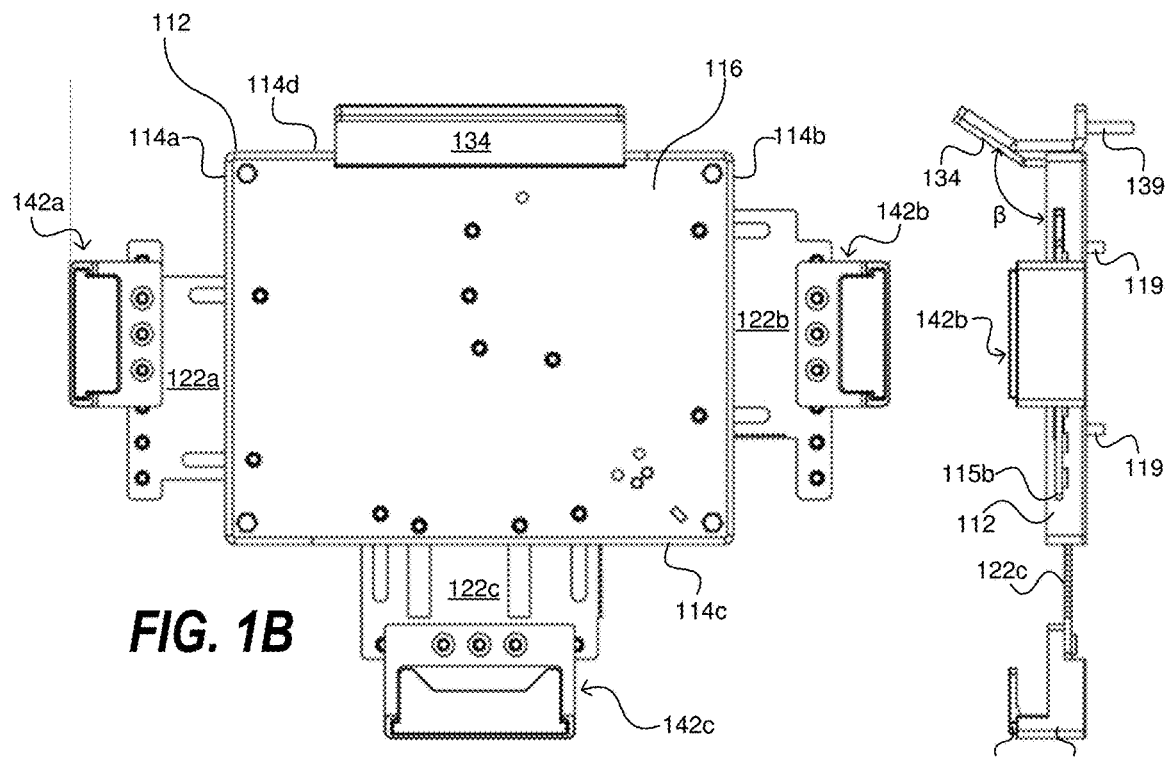
FIG. 1B
FIG. 1C
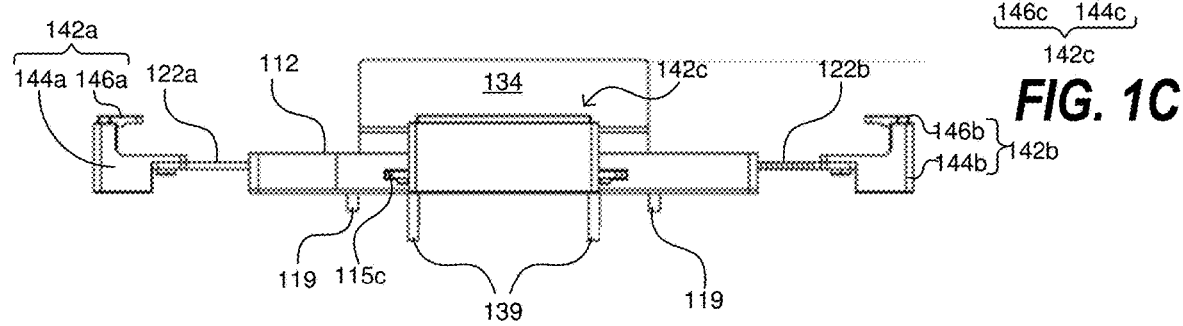
FIG. 1D

ADJUSTABLE APPARATUSES THAT SECURE LAPTOP COMPUTERS TO DISPLAY TABLES

PRIORITY CLAIM

This application claims priority to U.S. Provisional Patent Application No. 62/894,253, filed Aug. 30, 2019, which is incorporated herein by reference.

FIELD OF TECHNOLOGY

Embodiments of the present technology relate to apparatuses that physically secure laptops to tabletops of display tables or to other display surfaces.

BACKGROUND

Portable electronic devices, such as laptop computers, are often sold in retail stores. Laptop computers, as the term is used herein, include notebook computers, and can be referred to more succinctly as laptops. Such a laptop typically includes a lower body portion (that includes a keyboard) and an upper body portion (that includes a display screen) that are attached to one another by a hinge. The hinge allows the laptop to selectively be put in either a closed position or an open position by a person. When in the closed position, the lower and upper body portions are facing one another, and the keyboard and display screen are not viewable or accessible. When in the open position, the lower and upper body portions are not facing one another, and the keyboard and display screen are viewable and accessible.

To enable customers to view, touch, and interface with laptops in a retail store, the laptops are often displayed on a display table. The laptops, which are often costly, are often secured to the display table to prevent theft. For example, a laptop can be physically secured to a table using a cable or a laptop security mount. Such laptop security mounts may be customized for a specific size of a specific laptop. It often takes a few weeks to a few months lead-time for a laptop security mount manufacturer to design, build, and distribute a new customized laptop security mount that is suitable for securing a laptop to a display table. It is typically the case that whenever a new model of a laptop is released, the size (i.e., dimensions) of the laptop is changed compared to the previous model. Accordingly, it is typically the case that whenever a new model of a laptop is released, a new customized laptop security mount (that is suitable for securing the laptop to a display table) is not available to retail stores for at least a few weeks, and potentially up to a few months. This leads to a retail store needing to order new security mounts each time a new model of a specific laptop is released. Where a retail store sells multiple different models of laptops, each year that store may need to buy numerous new security mounts, which can be very costly and can thus significantly increase the overhead of the retail store.

SUMMARY

Embodiments of the present technology relate to apparatuses for physically securing a laptop in an open position to a tabletop of a display table or to another display surface, wherein the laptop includes a lower body portion including a keyboard and an upper body portion including a display screen and attached to the lower body portion by a hinge. In accordance with certain embodiments, an apparatus includes a main body having a top, a bottom, and walls that extends between the top and bottom. A left slot, a right slot, and a front slot are included in the walls of the main body. The apparatus also includes a left arm, a right arm, and a front arm, that extend respectively through the left slot, the right slot, and the front slot, and each of which is extendable and retractable relative to the main body. A left side brace, a right side brace, and a front side brace are, attached respectively to the left arm, the right arm, and the front arm, and configured to be secured to a left side, a right side, and a front side, respectively, of a lower body portion of a laptop to thereby secure the lower body portion of the laptop to the main body. A plurality of fasteners that extend downward from the bottom of the main body and are attachable to a tabletop of a display table or to another display surface to thereby secure the laptop, which is secured to the main body, to the tabletop or other display surface. Beneficially, embodiments of the present technology can be used with laptops of various different dimensions, including various different widths, depths, and thicknesses.

In accordance with certain embodiments, the apparatus further includes a lock mechanism configured to automatically lock the left, right, and the front arms in place after they have been at least partially retracted to thereby secure a lower body portion of a laptop to the main body. The lock mechanism is also configured to allow a user to selectively release the left, right, and front arms to thereby enable the arms to be extended to thereby allow the lower body portion of the laptop to be unsecured from the main body. In accordance with certain embodiments, the lock mechanism is inaccessible when the main body is attached to a tabletop or to another display surface, thereby preventing someone from releasing the arms after the arms have been at least partially retracted to secure a lower body portion of a laptop to the main body, and thereby preventing someone from removing a laptop from the main body after a lower body portion of the laptop has been secured to the main body and the lock mechanism has locked the arms in place.

In accordance with certain embodiments, the apparatus includes a gear within the main body and having teeth that intermesh with further teeth included on portions of the left and right arms to thereby cause the left and right arms to extend and retract relative to the main body in tandem.

In accordance with certain embodiments, the apparatus includes a plurality of springs within the main body that are configured to bias the left, right, and front arms in fully extended positions.

In accordance with certain embodiments, at least one side brace, of the left, right, and front side braces, includes a base and an adjustable clamp. The base is configured to be attached to a brace support portion of one of the left, right, and front arms. The adjustable clamp has a least portion of which is configured to be inserted into an opening in the base and pushed into the opening to adjust a height of the side brace to thereby enable the side brace to be secured to laptops of various different thicknesses. In certain embodiments, the adjustable clamp is configured to allow a user to push the adjustable clamp further into the opening of the base without allowing a user to push the adjustable clamp upward relative to the base. This can be achieved using a leaf spring having distal ends that engage with sawtooth profiles of inner walls of a channel within the base to thereby allow a user to push the adjustable clamp further into the opening of the base without allowing a user to push the adjustable clamp upward relative to the base. It is also within the scope of certain embodiments for at least one side brace, of the left, right, and front side braces, to have a fixed height.

In accordance with certain embodiments, the apparatus also includes a back support configured to be attached to a back one of the walls of the main body. The back support is also configured to allow an upper body portion of a laptop, whose lower body portion is secured to the main body, to be at an obtuse angle relative to a lower body portion of a laptop that is secured to the main body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1B, 10, and 1D are respectively, top, side, and front views of the mount introduced in FIG. 1A. FIGS. 1A through 1I can be referred to collectively herein as FIG. 1.

FIGS. 2A through 2C can be referred to collectively herein as FIG. 2.

FIGS. 3A through 3C can be referred to collectively herein as FIG. 3.

FIGS. 4A through 4C can be referred to collectively herein as FIG. 4.

FIGS. 6A through 6C can be referred to collectively as FIG. 6.

FIGS. 10 and 11 are respectively perspective and side views of an embodiment of the security mount attached to a bracket that in turn is attached to a tabletop.

DETAILED DESCRIPTION

Embodiments of the present technology generally relate to apparatuses that can be used to physically secure laptops to tabletops of display tables or to other display surfaces. The benefits, features, and advantages of the various embodiments of the present technology will become better understood with regard to the following description and accompanying drawings. The following description is presented to enable one of ordinary skill in the art to make and use embodiments of the present technology as provided within the context of a particular application and its requirements. Various modifications to the embodiments described herein will, however, be apparent to one skilled in the art, and the general principles defined herein may be applied to other embodiments. Therefore, the embodiments of the present invention are not intended to be limited to the particular embodiments shown and described herein, but are to be accorded the widest scope consistent with the principles and novel features herein disclosed.

Figure 1A:
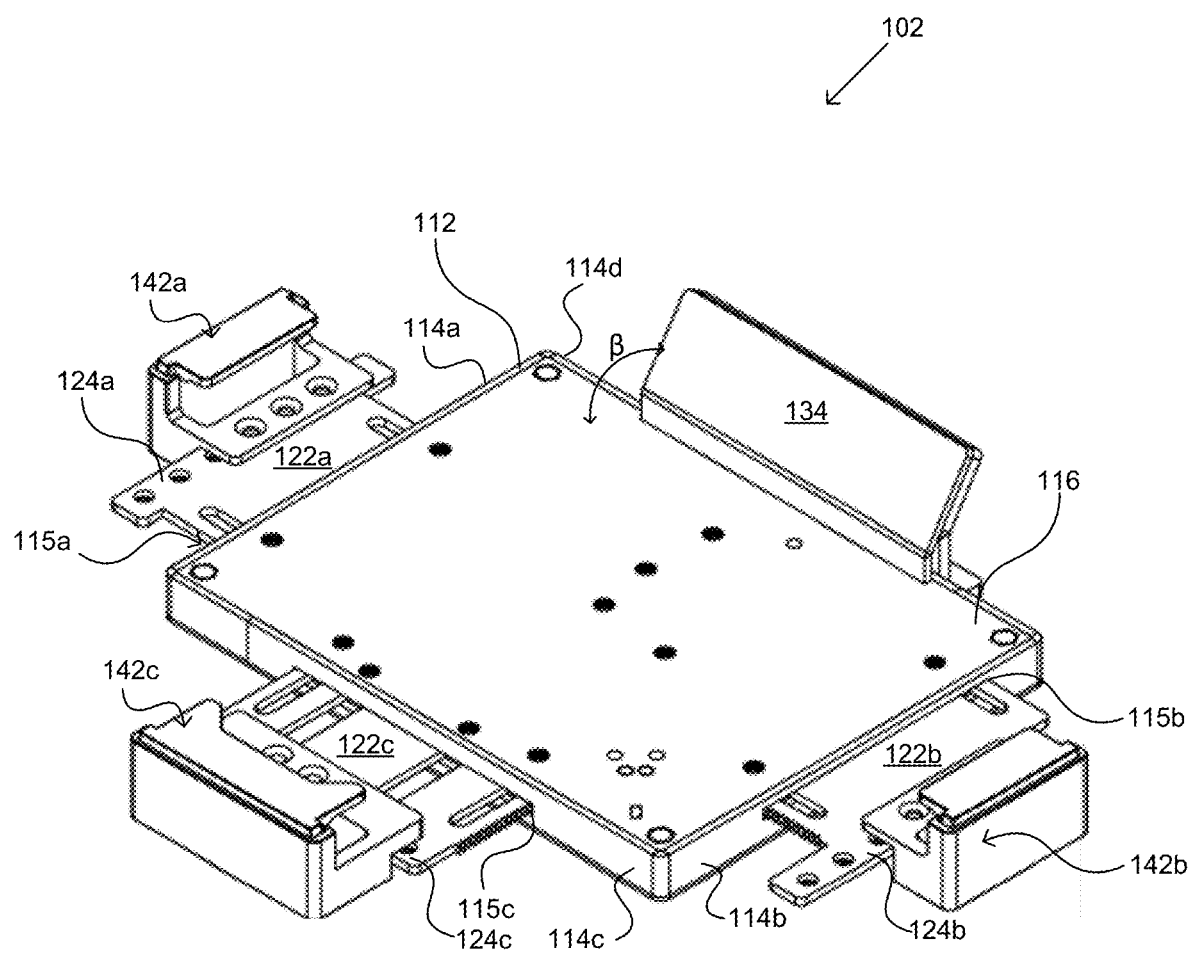
FIG. 1A is a front perspective view of an adjustable laptop security mount, according to an embodiment of the present technology, which can be used to mount a laptop computer to a tabletop of a display table or to another display surface.
Figure 1E:
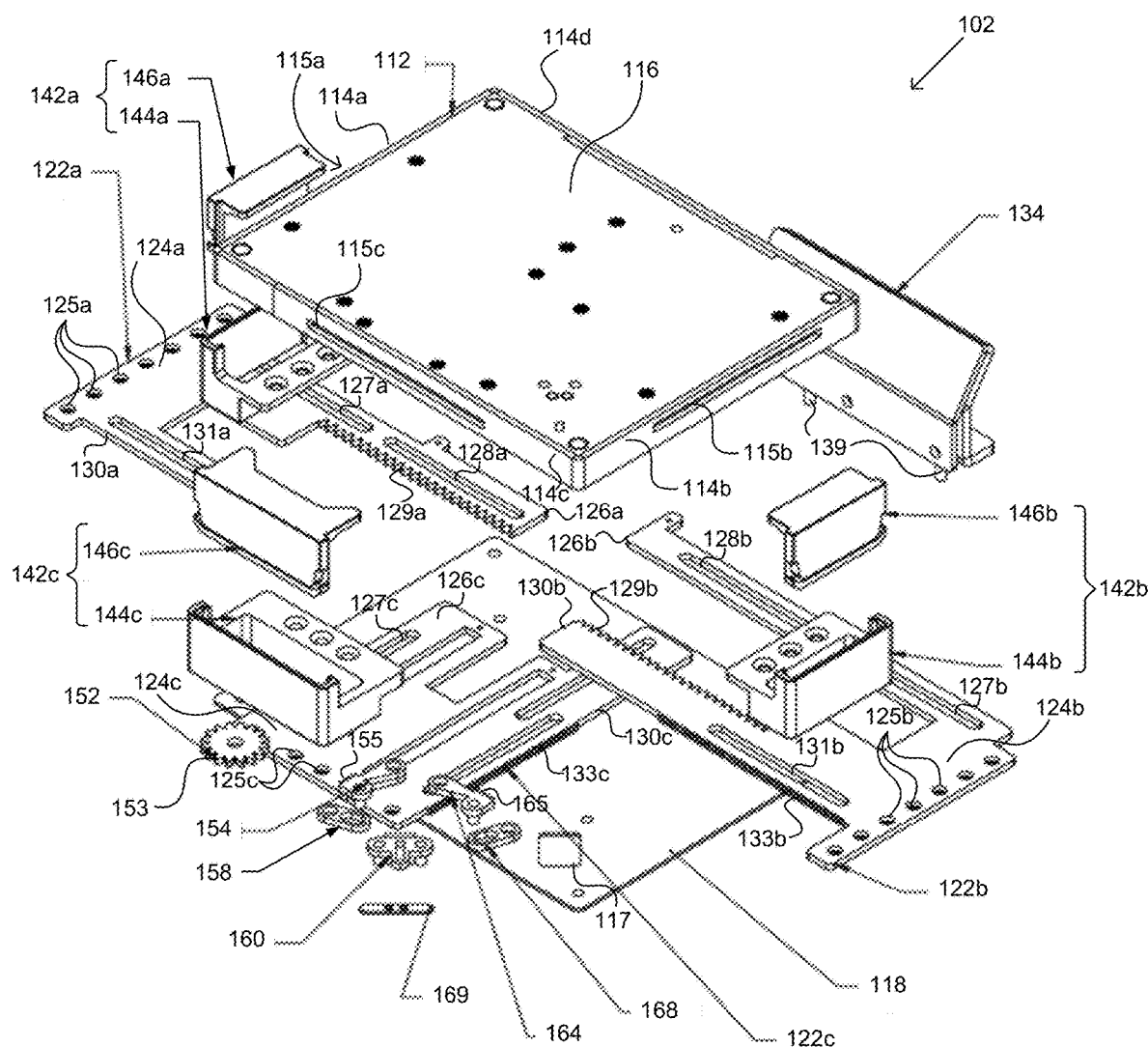
FIG. 1E is an exploded view of the mount 102 introduced in FIG. 1A.
Figure 10:
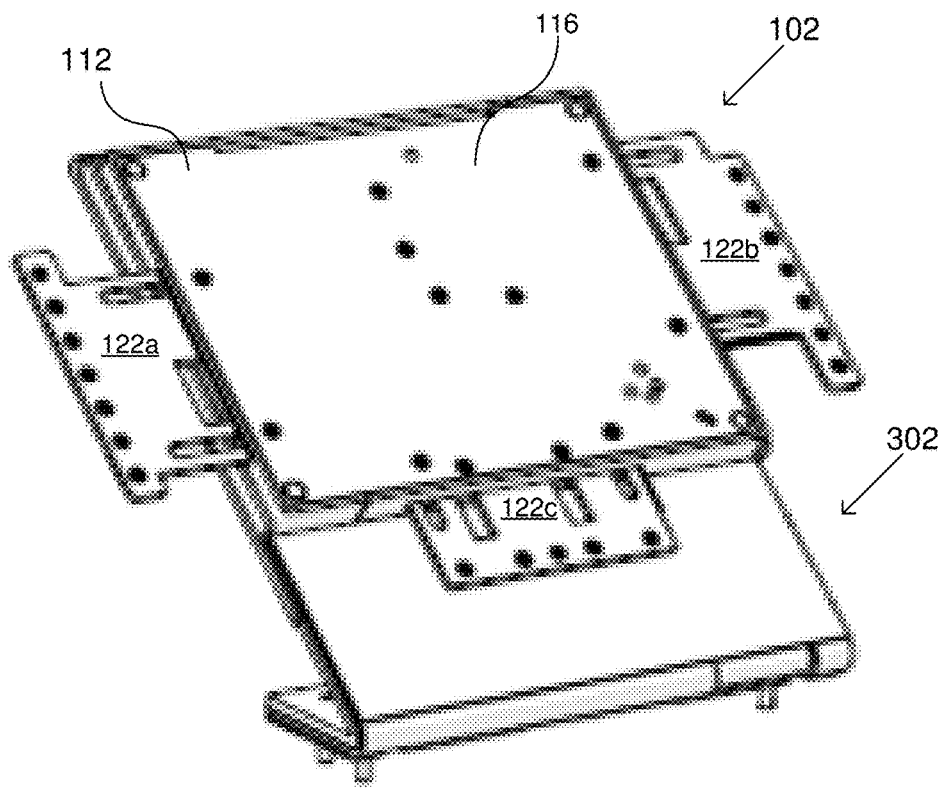

FIG. 1A is a front perspective view of an adjustable laptop security mount 102, according to an embodiment of the present technology, which can be used to mount a laptop computer to a tabletop of a display table or to another display surface. The adjustable laptop security mount 102 can also be referred to more succinctly herein as the security mount 102, or even more succinctly as the mount 102. FIGS. 1B, 10, and 1D are respectively, top, side, and front views of the mount 102. FIG. 1E is an exploded view of the mount 102 introduced in FIG. 1A. 1F and 1G are bottom views of the mount 102 with a bottom cover plate 118 of a main body 112 removed to better show how innerworkings of the mount 102 operate. FIGS. 1H and 1I show a portion of a lock mechanism 120 of the mount 102 with a spring shield 169 removed. FIGS. 1A through 1I can be referred to collectively herein as FIG. 1. As will be appreciated from the following discussion, because of the adjustability of the security mount 102 it can beneficially be used with laptops of various different dimensions, including various different widths, depths, and thicknesses.

Referring to FIG. 1, especially FIG. 1E thereof, the mount 102 is shown as including a main body 112, a left arm 122a, a right arm 122b, a front arm 122c, a back support 134, a left side brace 142*a*, a right side brace 142*b*, and a front side brace 142*c*. The main body 112 is shown as including a left wall 114*a*, a right wall 114*b*, a front wall 114*c*, and a back wall 114*d*, which collectively make up a peripheral wall 114 of the main body 112. The main body 112 is also shown as including a top cover plate 116 and a bottom cover plate 118. The top cover plate 116 and the bottom cover plate 118 can be said to define the top and bottom of the main body 112. The left wall 114*a* includes a slot 115*a*, which can also be referred to more specifically as the left slot 115*a*. Similarly the right wall 114*b* includes a slot 115*b*, which can also be referred to more specifically as the right slot 115*b*, and the front wall 114*c* includes a slot 115*c*, which can also be referred to more specifically as the front slot 115*c*. Extending downward from the bottom cover plate 118 are fasteners 119 (e.g., threaded bolts) that cannot be seen in FIG. 1, but can be seen in FIGS. 3A and 9 discussed below. The back support 134 is configured to be attached to the back wall 114*d* of the main body 112, e.g., using one or more fasteners (e.g., three threaded screws). Extending downward from the back support 134 are further fasteners 139 (e.g., threaded bolts) at least some of which can be seen in FIG. 1, and which can also be seen in FIGS. 3A and 9 discussed below.

The left arm 122*a* and the right arm 122*b* are extendable and retractable out of and into the left slot 115*a* and the right slot 115*b*, respectively, in the walls 114*a*, 114*b* of the main body 112. In accordance with certain embodiments, the left arm 122*a* and the right arm 122*b* move in concert with one another, i.e., in tandem. More specifically, in certain embodiments, manually maneuvering one of the left and right arms 122*a*, 122*b* will cause the other one of the arms to be maneuvered. For example, maneuvering the left arm 122*a* further out of the left slot 115*a* will also cause the right arm 122*b* to be maneuvered further out of the right slot 115*b*, and vice versa. Conversely, pushing the left arm 122*a* further into the left slot 115*a* will also cause the right arm 122*b* to be pushed further into the right slot 115*b*, and vice versa. This will ensure that a laptop that is secured to the mount 102 is centered left to right. The front arm 122*c* is maneuverable further into and out of the front slot 115*c* independent of the left and right arms 122*a*, 122*b*. The maneuverability of the left and right arms 122*a*, 122*b* enables the mount 102 to be used with laptops of various different widths. The maneuverability of the front arm 122*c* enables the mount 102 to be used with laptops of various different depths. The terms maneuverability and adjustability are often used interchangeably herein.

The left arm 122*a* includes a brace support 124*a* having through-holes 125*a*. The brace support 124*a* is used to support the left side brace 142*a* which can be attached thereto using fasteners (e.g., threaded screws, not shown). The left arm 122*a*, as seen for example in FIGS. 1E, 1F, and 1G, also includes a posterior appendage 126*a* and an anterior appendage 130*a* that are separated from one another by a gap. The posterior appendage 126*a* includes elongated channels 127*a* and 128*a*, which are in-line with one another, and teeth 129*a* that form a toothed edge that faces in a direction of the anterior appendage 130*a*. The anterior appendage 130*a* includes an elongated channel 131*a*.

The right arm 122*b* includes a brace support 124*b* having through-holes 125*b*. The brace support 124*b* is used to support right side brace 142*b* which can be attached thereto using fasteners (e.g., threaded screws, not shown). The right arm 122*b*, as seen for example in FIGS. 1E, 1F, and 1G, also includes a posterior appendage 126*b* and an anterior appendage 130*b* that are separated from one another by a gap. A gap between appendages of an arm allows another appendage of another arm to fit therein when arms are retracted. The posterior appendage 126*b* includes elongated channels 127*b* and 128*b*, which are in-line with one another. The anterior appendage 130*b* includes elongated channel 131*b*, and includes teeth 129*b* that form a toothed edge that faces in the direction of the posterior appendage 126*b*. The anterior appendage 130*b* also includes further teeth 133*b* that form a further toothed edge that faces in an opposite direction than the toothed edge formed by the teeth 129*b*. As will be described in additional detail below, the teeth 133*b* are used by (and may be considered part of) a lock mechanism 120 to selectively lock and release the left and right arms 122*a*, 122*b* of the mount 102.

The front arm 122*c* includes a brace support 124*c* having through-holes 125*c*. The brace support 124*c* is used to support front side brace 142*c* which can be attached thereto using fasteners (not shown). The front arm 122*c*, as seen for example in FIGS. 1E, 1F, and 1G, also includes a left appendage 126*c* and a right appendage 130*c* that are separated from one another by a gap. The left appendage 126*c* includes an elongated channel 127*c*. The right appendage 130*c* includes elongated channels 131*c*, 132*c*, which are offset from and parallel to one another. The right appendage 130*c* of the front arm 122*c* also includes teeth 133*c* that form a toothed edge. As will be described in additional detail below, the teeth 133*c* are used by (and may be considered part of) a lock mechanism 120 to selectively lock and release the front arm 122*c* of the mount 102.

The left side brace 142*a*, the right side brace 142*b*, and the front side brace 142*c* can also be referred to collectively as the side braces 142, or individually as a side brace 142. In certain embodiments the side braces 142 are adjustable, in which cases they each include a base and an adjustable clamp portion. More specifically, as shown in FIG. 1E (and FIG. 4A discussed below) an adjustable left side brace 142*a* includes a base 144*a* and an adjustable clamp portion 146*a* that fits within an opening in the base 144*a*, as will be described in further detail below. Similarly, an adjustable right side brace 142*b* includes a base 144*b* and an adjustable clamp portion 146*b*. An adjustable front side brace 142*c* includes a base 144*c* and an adjustable clamp portion 146*c*. The bases 144*a*, 144*b*, and 144*c* can be referred to collectively as the bases 144, or individually as a base 144. Similarly, the adjustable clamp portions 146*a*, 146*b*, and 146*c* can be referred to collectively as the adjustable clamp portions 146, or individually as an adjustable clamp portion 146. Each adjustable clamp portion 146 can also be referred to more succinctly herein as an adjustable clamp 146. Where the side braces 142 are adjustable, they can be used with various different laptops having a wide range of thicknesses. In alternative embodiments the side braces 142 are not adjustable and are configured for use with laptops having a relatively narrow range of thicknesses. Multiple such non-adjustable side braces 142 can be made available and appropriate braces can be selected for attachment to the brace supports 124*a*, 124*b*, and 124*c* of the arms 122*a*, 122*b*, and 122*c*, respectively, depending upon the thickness of the lower body portion of the laptop that is to be secured by the mount 102. It is also possible for the mount 102 to have a combination of adjustable and non-adjustable side braces 142, e.g., the left and right side braces can be adjustable or the front side brace can have a fixed height, or the left and right side braces can each have a fixed height and the front side brace can be adjustable in height.

As shown in FIG. 1A, an angle β between the top cover plate 116 (of the main body 112) and the back support 134 is an obtuse angle (between about 110 degrees and 150 degrees, e.g., 130 degrees) to thereby allow an upper body portion of a laptop (which upper body portion includes a display screen) to be at an obtuse angle relative to a bottom portion of the laptop (which bottom portion includes a keyboard). The back support also helps prevent someone from sliding the laptop backwards to remove it from the security mount 102. The obtuse angle β is also shown in the side view in FIG. 10.

Figure 1F:
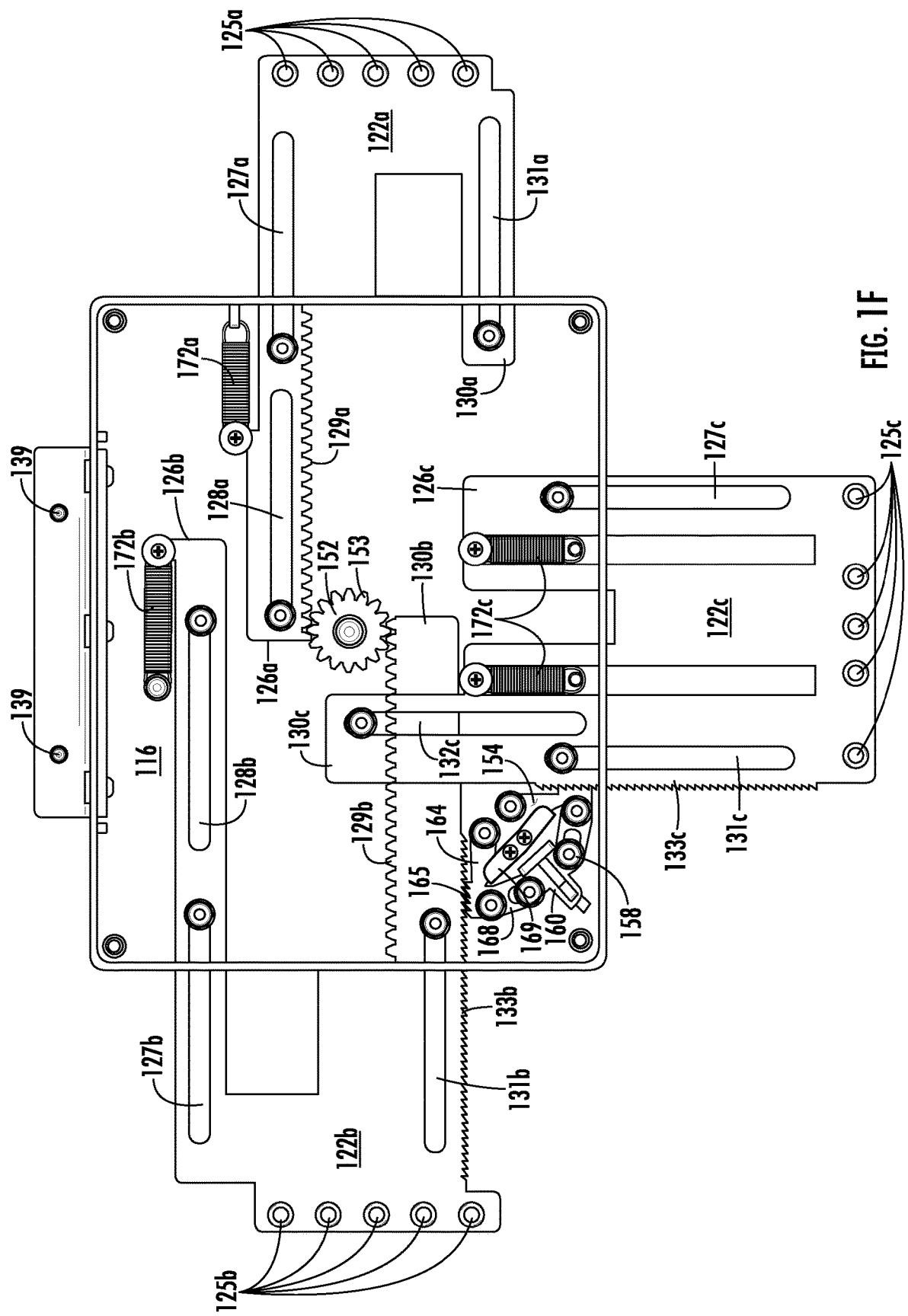
FIGS. 1F and 1G are bottom views of the mount introduced in FIG. 1A with a bottom cover plate of a main body removed to better show the innerworkings of the mount.
Figure 1G:
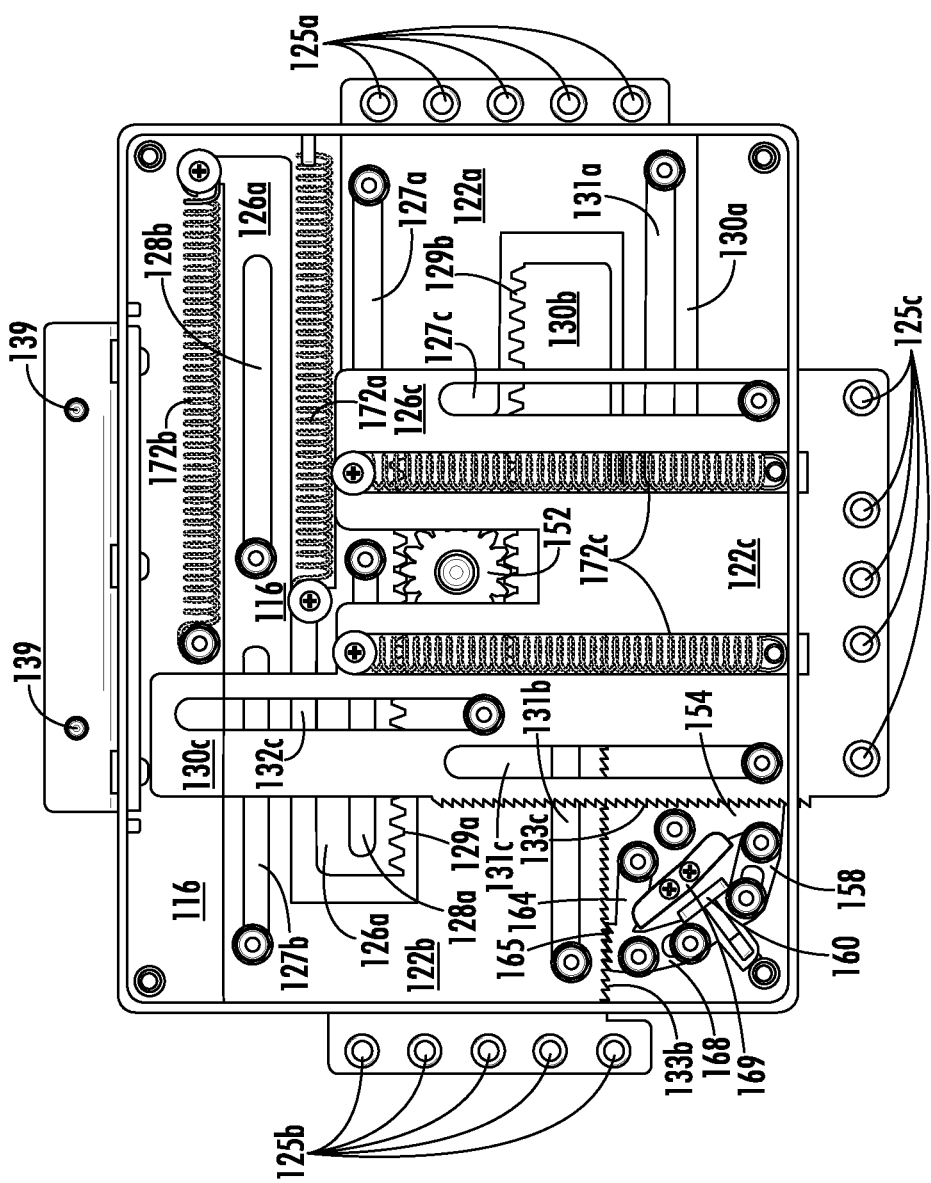
Figure 1I:
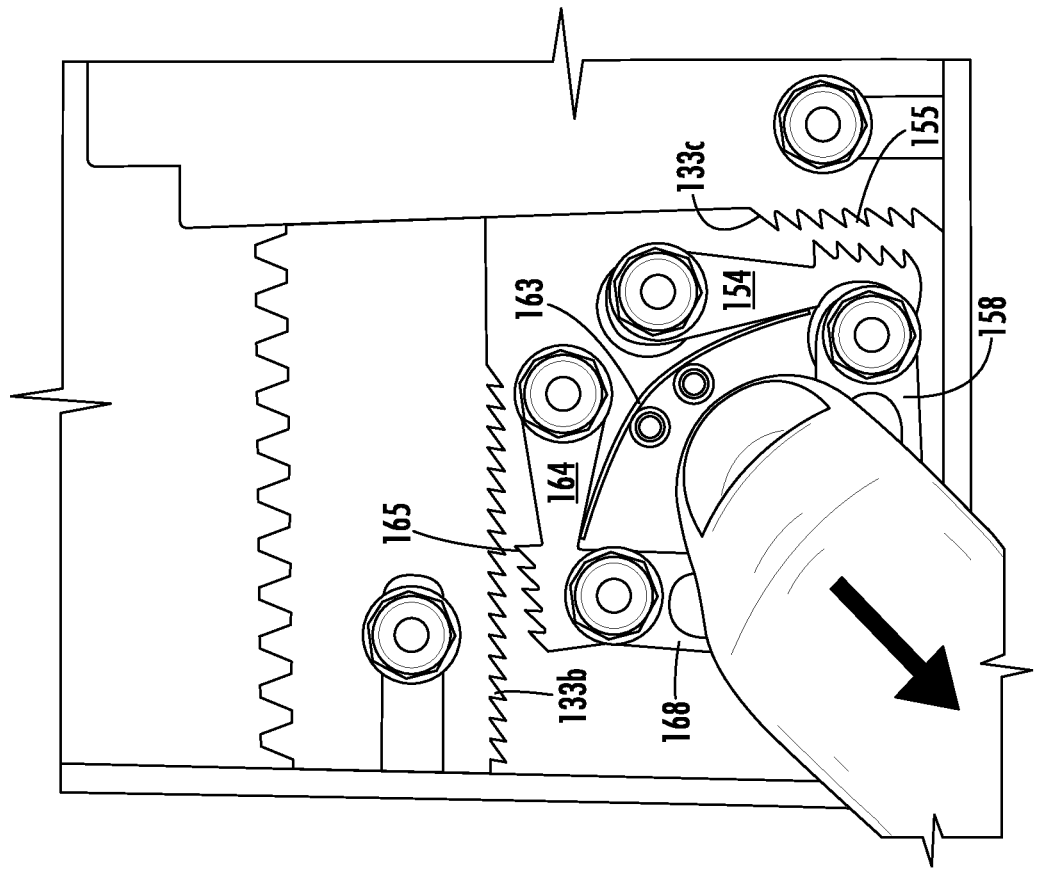
FIGS. 1H and 1I show a portion of a lock mechanism of the mount with a spring shield removed.
Figure 1H:
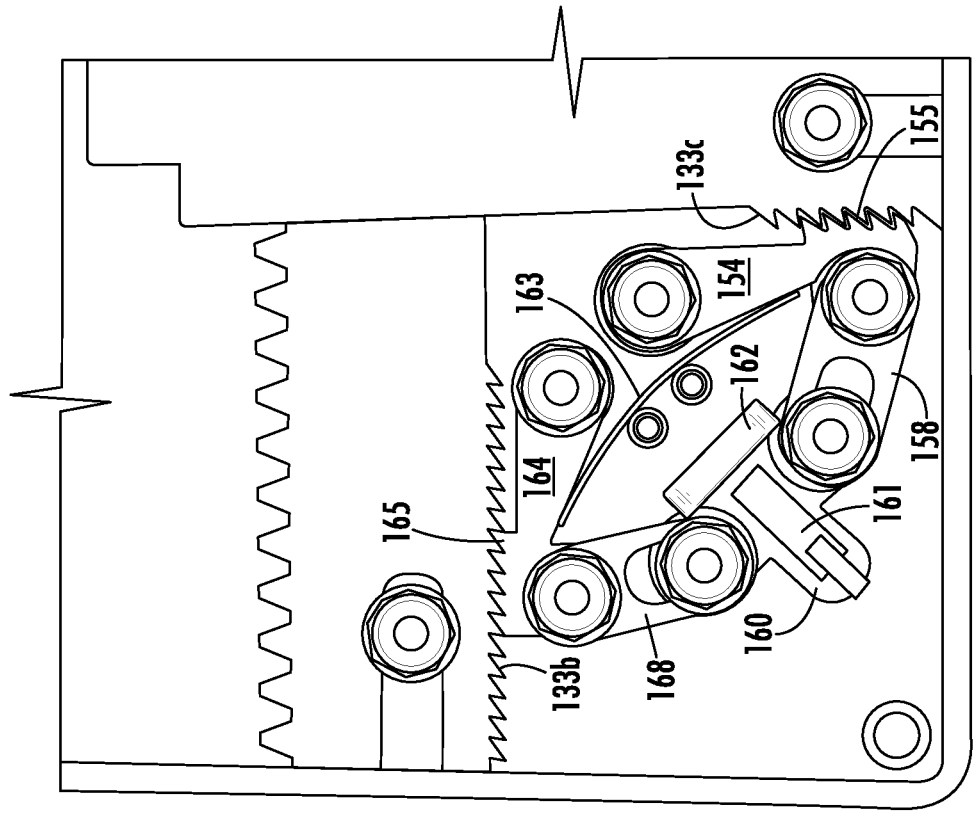

Referring now to FIGS. 1E, 1F and 1G, the mount 102 also includes a circular gear 152 that includes teeth 153 around its circumference. The toothed edge formed by the teeth 129a of the posterior appendage 126a of the left arm 122a provide a first rack gear. Similarly, the toothed edge formed by the teeth 129b of the anterior appendage 130b of the right arm 122b provide for a second rack gear. The teeth 153 of the circular gear 152 intermesh with these first and second rack gears to thereby cause the left arm 122a and the right arm 122b to move in and out relative to the main body 112 in tandem with one another.

FIGS. 1F and 1G are bottom views of the mount 102 with the bottom cover plate 118 of the main body 112 removed to better show how the innerworkings of the mount 102 operate. In FIG. 1F the left, right, and front arms 122a, 122b, and 122c are in their fully extended positions. In FIG. 1G the left, right, and front arms 122a, 122b, and 122c are in their fully retracted positions. Referring to FIGS. 1F and 1G, expansion coils springs 172a and 172b are used to bias the left and right arms 122a, 122b in their fully extended position, and a pair of expansion coil springs 172c are used to bias the front arm 122c in its fully extended position. More specifically, the spring 172a is fastened between a portion of the posterior appendage 126a (of the left arm 122a) and a peg or fastener that is attached to the top cover plate 116. The spring 172b is fastened between a portion of the posterior appendage 126b (of the right arm 122b) and another peg or fastener that is attached to the top cover plate 116. The springs 172c are fastened between portions of the left and right appendages 126c and 130c (of the front arm 122c) and further pegs or fasteners that are attached to the top cover plate 116. The springs 172a, 172b, and 172c can be referred to collectively as springs 172, or individually as a spring 172. Each of the expansion springs 172, which can also be referred to as extension springs 172, is used to carry an amount of tension in between its coils in order to keep them together and be used to store energy when pulled apart by a force. In FIG. 1F, where the arms 122 are in their fully extended positions, the springs 172 are in their tightly coiled normal or relaxed state wherein their coils are not stretched or expanded. So long as the arms 122 are at least partially retracted, the springs 172 will be at least partially stretched or expanded and store energy. In FIG. 1G, where the arms 122 are in their fully retracted positions, the springs 172 are in stretched or extended, and the springs 172 will attempt to pull themselves back into their tightly coiled normal or relaxed state. As will be described in additional detail below, the lock mechanism 120 of the mount 112 prevents this from happening until a user desires this to happen, and more generally, until a user releases the lock mechanism 120. In accordance with certain embodiments, in response to the lock mechanism 120 being released while the arms are in at least partially retracted positions (e.g., because the mount 102 was being used to secure a laptop thereto), energy stored by the springs 172 will cause the arms to automatically move to their fully extended positions.

As can be seen in FIGS. 1F and 1G, some of the pegs or fasteners that are attached to the top cover plate 116 extend through the various channels (e.g., 127a, 128a, 131a, 127b, 128b, 132b, 127c, 131c, and 132c) within the various appendages (e.g., 126a, 130a, 126b, 130b, 126c, 130c) of the arms 122a, 122b, 122c to act as guides for the arms 122, and maintain proper alignment of the arms 122 relative to the main body 112 and one another.

Figure 2A:
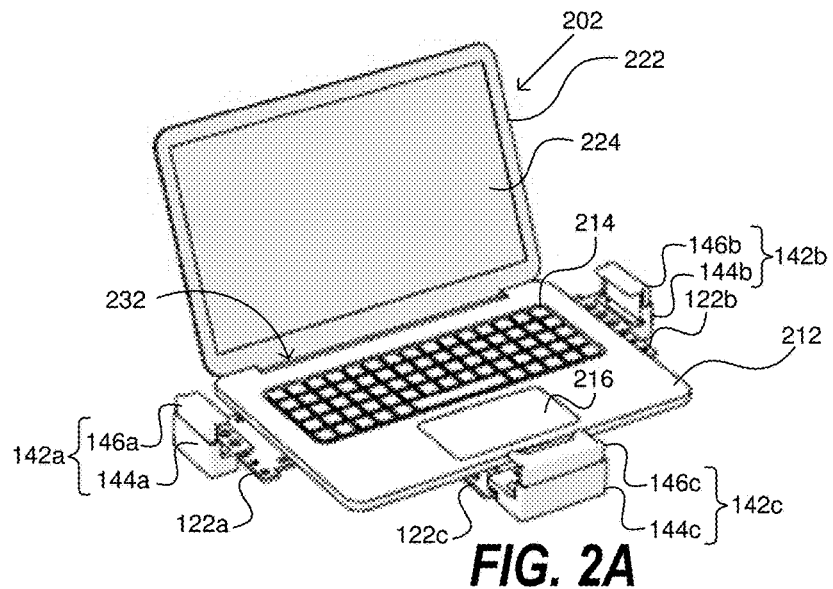
FIG. 2A illustrates how a laptop can be placed on the security mount, introduced in FIG. 1A, when the left, right, and front arms of the security mount are in extended positions.

FIG. 2A illustrates how a laptop 202 can be placed on the security mount 102 when the left, right, and front arms 122 of the security mount 102 are in extended positions. The laptop 202 includes a lower body portion 212 and an upper body portion 222 that are attached to one another by a hinge 232. The lower body portion 212 includes a keyboard 214, and the upper body portion 222 includes a display screen 224 that may or may not be a touch screen. The lower body portion 212 may also include a touchpad 216 or other type of pointing device that enables a cursor and/or other displayed elements to be maneuvered by a user. The hinge 232 allows the laptop 202 to be selectively put in either a closed position or an open position. When in the closed position, the lower and upper body portions 212, 222 face one another and the keyboard 214 and display screen 224 of the laptop 202 are facing one another and not viewable or accessible. When in the open position, the lower and upper body portions 212, 222 are not facing one another, are preferably at an obtuse angle relative to one another, and the keyboard 214 and display screen 224 are viewable and accessible.

One or both sides of the lower body portion 212 of the laptop 202 likely have input ports and/or slots, which can include, for example, one or more USB, HDMI, VGA, an SD card slot and/or memory stick reader slot, and/or Ethernet ports, as well and a power cord port, but are not limited thereto. In accordance with certain embodiments, by allowing users to attach the side braces 142 to different combinations of through-holes 125 in the brace supports 124 of the arms 122, the side braces 142 can be positioned so as to not block the various input ports/slots and the power cord port included in a particular laptop that is to be secured using the mount 102.

Figure 2B:
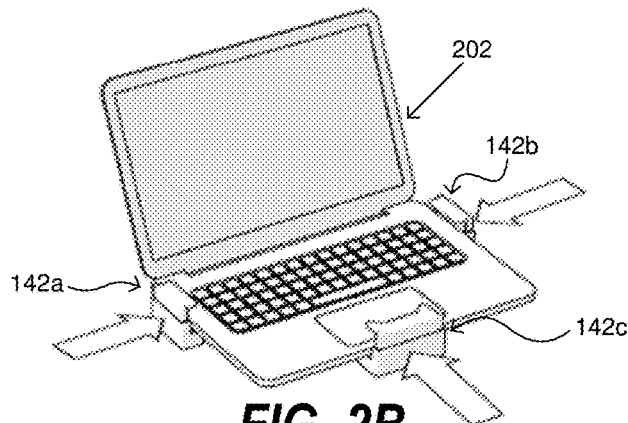
FIG. 2B illustrates how the left, right, and front arms of the security mount can be retracted, by pushing them inward, until left, right, and front side braces attached to the respective arms butt against left, right, and front sides of a lower body portion of a laptop.

FIG. 2B illustrates how the left, right, and front arms 122a, 122b, and 122c of the security mount 102 can be retracted, by a user pushing them inward, until left, right, and front side braces 142a, 142b, and 142c attached to the respective arms 122 butt against left, right, and front sides of the lower body portion 212 of the laptop 202. In certain embodiments, pawls 154 and 164 of the lock mechanism 120 (which pawls are shown in FIGS. 1E through 1I) can be biased and positioned such that as the arms 122 are pushed inward (i.e., retracted) by a user the arms 122 are prevented from moving back outward (i.e., from being extended) until the lock mechanism 120 is released. This is achieved by use of an appropriate sawtooth geometry for the teeth 133b and 133c (on appendages of the arms 122b and 122c) and teeth 155 and 165 on the pawls 154, 164 (of the lock mechanism 120). In other words, profiles of the teeth are designed to achieve this feature, as can be appreciated from FIGS. 1F and 1G.

Figure 2C:
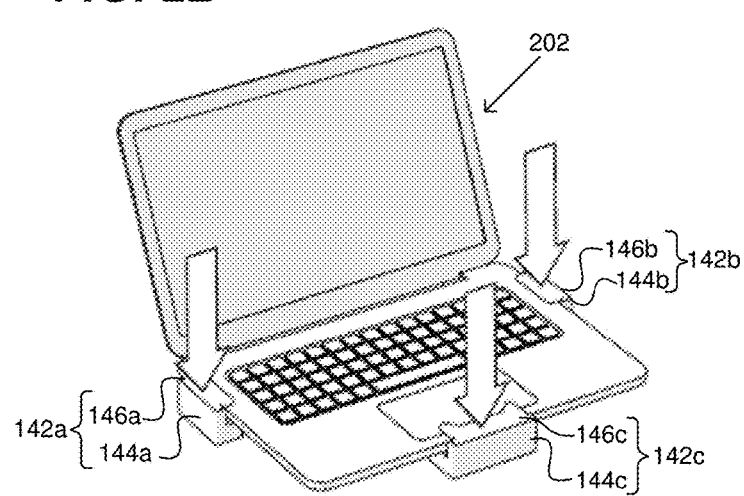
FIG. 2C illustrates how the left, right, and front side braces, which are attached to respective arms, can be pushed downward to secure the side braces to the left, right, and front sides of a lower body portion of a laptop.

FIG. 2C illustrates how adjustable clamp portions 146 of the left, right, and front side braces 142 (having bases 144 thereof that are attached to respective arms 122), can be pushed downward to secure the side braces 142 to the left, right, and front sides of the lower body portion 212 of the laptop 202. The back support 134, as noted above, assist in preventing someone from sliding the laptop 202 backwards to remove it from the security mount 102 once the laptop 202 is secured thereto using the side braces 142 and locked in place using the lock mechanism 120. In accordance with certain embodiments, the lock mechanism 120 is biased (e.g., by a leaf spring 163) to be normally in a locked state, which bias can be overcome by a user to transition the lock mechanism 120 from the locked state to a released state.

Figure 3A:
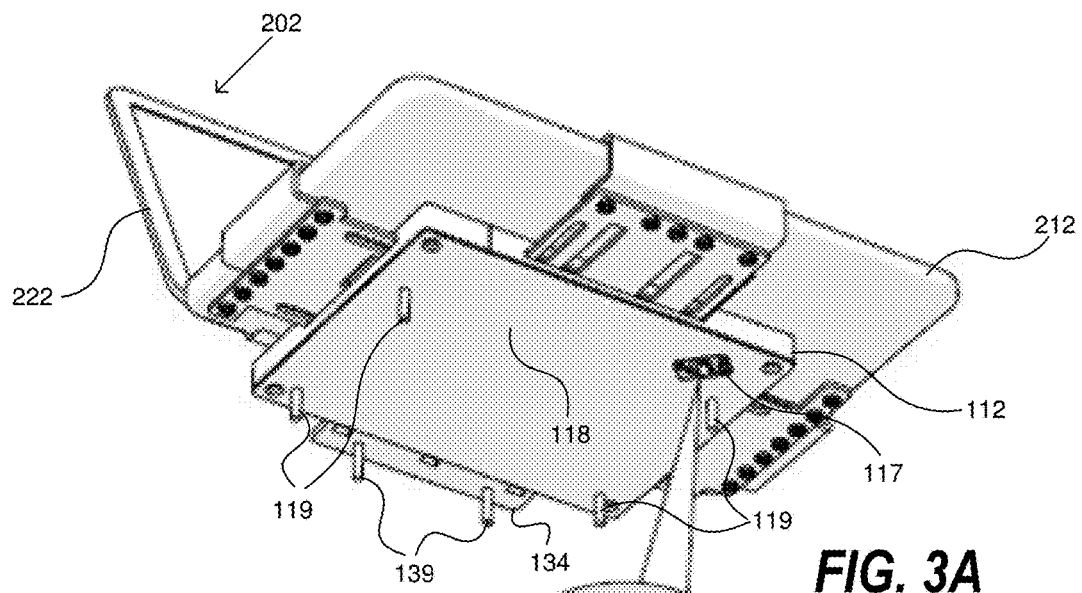
FIG. 3A illustrates an underside of the adjustable laptop security mount, where a lock mechanism of the adjustable laptop security mount can be accessed.

FIG. 3A illustrates an underside of the adjustable laptop security mount, where the lock mechanism 120 of the adjustable laptop security mount 102 can be accessed through an opening 117 in the bottom cover plate 118. FIG. 3A also shows fasteners 119 (e.g., threaded screws) extending downward from the bottom cover plate 118 and fasteners 139 (e.g., threaded screws) extending downward from the back support 134. The fasteners 119 and 139 can be used to secure the mount 102 (and a laptop, e.g., 202, secured thereto) to a tabletop of a display table that includes through-holes that are appropriately located (i.e., spaced apart) so as to accept the fasteners 119 and 139 that extend downwards from the security mount 102. The through-holes can be drilled in appropriate locations in a tabletop, or can be prearranged in a predetermined patterns of rows and columns of through-holes. Nuts (e.g., wingnuts) and/or other fastener hardware can then be used to secure the security mount 102 (and a laptop, e.g., 202, secured thereto) to the tabletop of a display table from the underside of the tabletop. Preferably, the underside of the tabletop is made inaccessible to customers and potential thieves in a retail store, e.g., by being encased in a locked enclosure. This way potential thieves cannot remove the security mount 102 from the display table, and thus, could not steal the laptop (e.g., 202) that is secured to the display table by the security mount 102. In specific embodiments, the fasteners 119 and 139 are threaded PEM™ stud fasteners available from PennEngineering (headquartered in Danboro, Pa.). The length of each of the fasters can be, e.g., about 0.75 inches, but is not limited thereto.

Each of the elements of the security mount 102 are preferably made of a strong metal or alloy (aka metal/alloy) so that the security mount 102 is sturdy and cannot be readily bent, cut through, or otherwise broken or tempered with. For example, such elements can be made of steel. Different elements of the security mount 102 can be made of the same metal/alloy or different metals/alloys than other elements. All or subsets of such elements can be painted, powder coated, or otherwise covered to have any desired color and appearance. Certain elements of the security mount 102 can be molded, cast and/or machined. Certain elements of the security mount 102, such as the arms 122, front and back cover plates 116, 118, and side braces 142 that are fixed in height, can be made from blanks that are cut (e.g., laser cut or mechanically cut) or stamped from a sheet of metal/alloy, and then bent if appropriate into a desired final configuration. It would also be possible that certain elements, such as the front and/or back cover plates 116, 118 be made of a strong plastic, since they won't be accessible while the mount 102 is securing a laptop to a display surface.

Figure 3B:
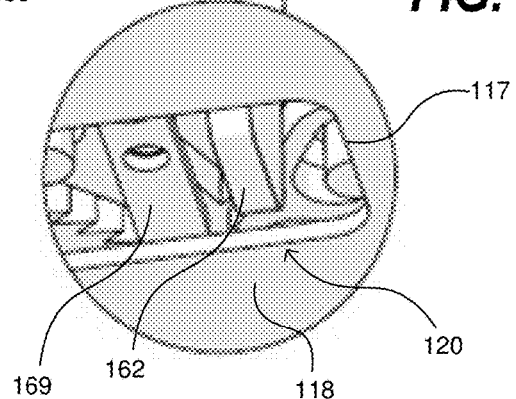
FIG. 3B illustrates how a lock mechanism of the adjustable laptop security mount can be placed in a locked position after a laptop has been secured thereto.
Figure 3B:
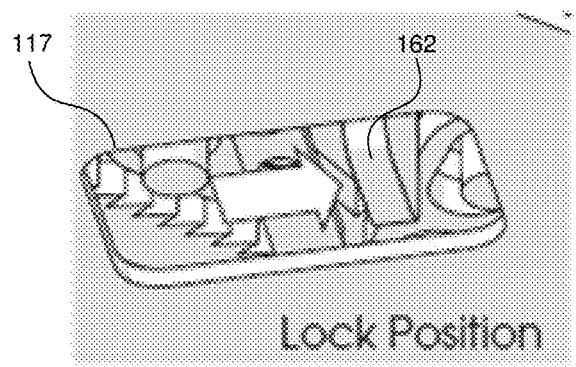
Figure 3C:
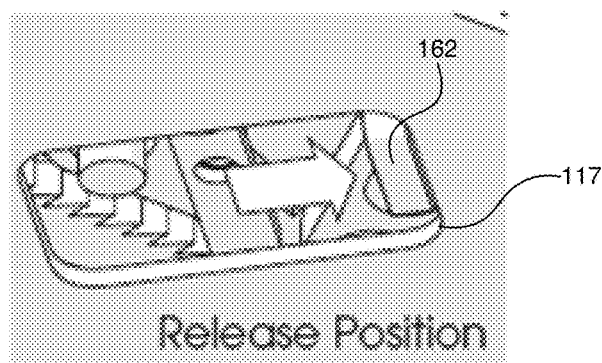
FIG. 3C illustrates how the lock mechanism of the adjustable laptop security mount can be placed in a release position, to thereby enable a laptop that had been secured to the security mount to be removed therefrom.

FIG. 3B illustrates how the lock mechanism 120 of the adjustable laptop security mount 102 can be placed in a locked position after a laptop, e.g., 202, has been secured thereto. FIG. 3C illustrates how the lock mechanism 120 of the adjustable laptop security mount 102 can be placed in a release position, to thereby enable a laptop (e.g., 202) that had been secured to the security mount 102 to be removed therefrom. Additional details of the lock mechanism, according to specific embodiments of the present technology, are described below with reference to FIGS. 1E and 1I. Alternative implementations of the lock mechanism 120, besides those specifically described herein, are also within the scope of the embodiments described herein.

Referring back to FIG. 1E, elements of the lock mechanism 120 that are shown in FIG. 1E include a front pawl 154, a side pawl 164, a front link 158, a side link 168, a slide release 160, and a spring shield 169. The front pawl 154 is pivotable about a pivot point (provided by a peg or fastener) and includes teeth 155 that are configured to be selectively engaged with the teeth 133c on the appendage 130c of the front arm 122c, to thereby selectively lock the front arm 122c in place. The side pawl 164 is pivotable about a pivot point (provided by a peg or fastener) and includes teeth 165 that are configured to be selectively engaged with the teeth 133b on the appendage 130b of the right arm 122b, to thereby selectively lock the right arm 122b in place. Since the left and right arms 122a and 122b move in tandem due to the gear 152, as explained above, when the right arm 122b is locked in place the left arm 122c is also locked in place. The front link 158 and the side link 168 connect the front pawl 154 and the side pawl 164 to the slide release 160, so that the front and side pawls 154, 164 are pivoted at the same time using the slide release 160. The slide release 160 is maneuverable, e.g., by a finger of a user, into either a lock position or a release position. When the slide release 160 is in its lock position the teeth 155, 165 of the front and side pawls 154, 164 intermesh with the teeth 133c and 133b of the font and right side arms 122c, 122b to thereby lock all the arms 122a, 122b, and 122c in place after a lower body of a laptop had been secured to the main body 112 of the mount 102. When the slide release 160 is maneuvered into in its release position the teeth 155, 165 of the front and side pawls 154, 164 are moved away from the teeth 133c and 133b of the font and right side arms 122c, 122b to thereby release all the arms 122a, 122b, and 122c, and thereby allow removal of a lower body of a laptop that had been secured to the main body 112 of the mount 102. The shield spring is used to keep in place a leaf spring 163 (shown in FIG. 1H) that biases that pawls 154, 164 such that the teeth 155, 165 thereof normally engage with the teeth 133c, 133b on edges of portions of arms 122c, 122b. In other words, the leaf spring 163 biases the lock mechanism 120 in its lock position, which can also be referred to as its locked position.

FIGS. 1H and 1I show components of the lock mechanism 120 with the spring shield 169 removed, so that the leaf spring 163 normally covered by the spring shield 169 can be seen. FIGS. 1H and 1I also show that the slide release 160 includes a channel 161 and a tab 162. The channel 161 is used to hold the slide release 160 in place and enable the slide release 160 to be moved along a guide peg (shown as being rectangular) that extends from the top cover plate 116. The tab 162 enables a user to maneuver the slide release 160 between its lock position and release position, e.g., using a finger of the user, as shown in FIG. 1I. Referring briefly back to FIGS. 1E and 3, when the bottom cover plate 118 is attached to the main body 112, the opening 117 in the bottom cover plate 118 enables a user to access and maneuver the tab 162 using one of the user's finger. Referring again to FIGS. 1H and 1I, the leaf spring 163 biases the slide release 160, and more generally the lock mechanism 120, in its lock position. When the biasing force of the leaf spring 163 is overcome by a user's finger, the links 158 and 168 move the teeth 155, 165 of the pawls 154, 164 away from teeth 133c, 133b on edges of portions of the arms 122c, 122b, thereby causing the arms 122 to automatically return to their extended positions due to the extension springs 172.

Figure 4A:
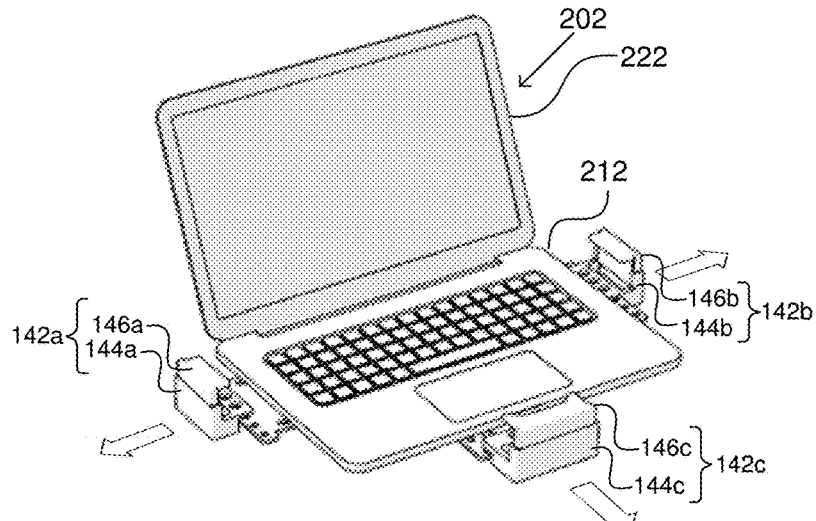
FIG. 4A illustrates that the left, right, and front arms of the security mount can be maneuvered from retracted positions to extended positions, to thereby enable a laptop that had been secured to the security mount to be removed therefrom.
Figure 4B:
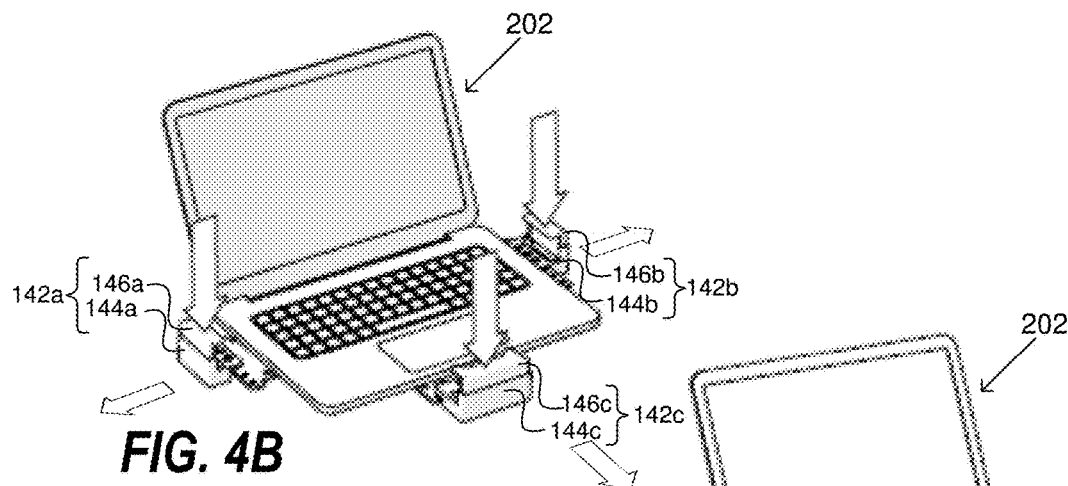
FIG. 4B illustrates how the left, right, and front side braces, which are attached to respective arms, can be pushed downward after the arms had been maneuvered from retracted positions to extended positions.
Figure 4C:
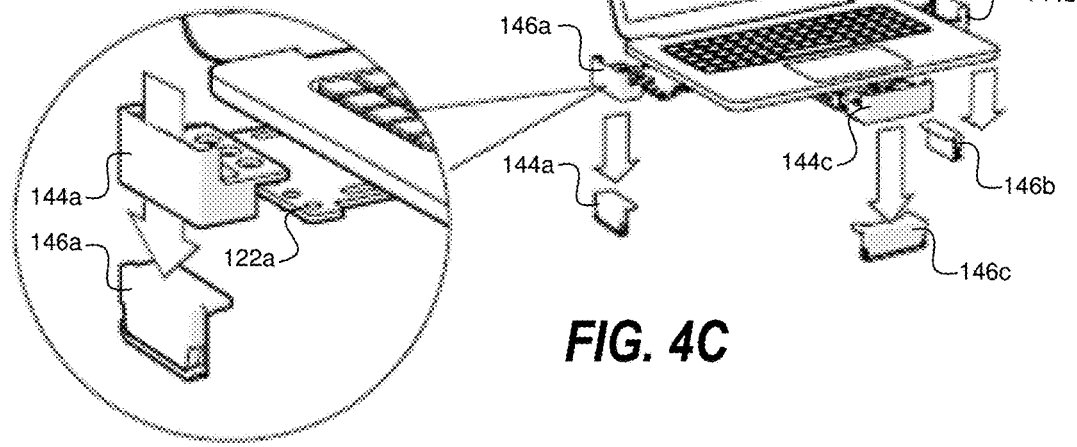
FIG. 4C illustrate how adjustable clamp portions of the left, right, and front side braces can be removed from respective bases of the side braces so that they can be reset.

FIG. 4A shows that the left, right, and front arms 122a. 122b, 122c of the security mount 102 transitioning from retracted positions to extended positions, to thereby enable a laptop 202 that had been secured to the security mount 102 to be removed therefrom. As noted above, this can be achieved by moving the slide release 160 of the lock mechanism 120 from the lock position to the release position. FIG. 4B illustrates how adjustable clamp portions 146 of the left, right, and front side braces 142a, 142b, 142c, which are attached to respective arms, can be pushed downward after the arms 122 had been maneuvered from retracted positions to extended positions. FIG. 4C illustrate how adjustable clamp portions 146 of the left, right, and front side braces 142 can be removed from respective bases 144 of the side braces 142 so that they can be reset.

Figure 5:
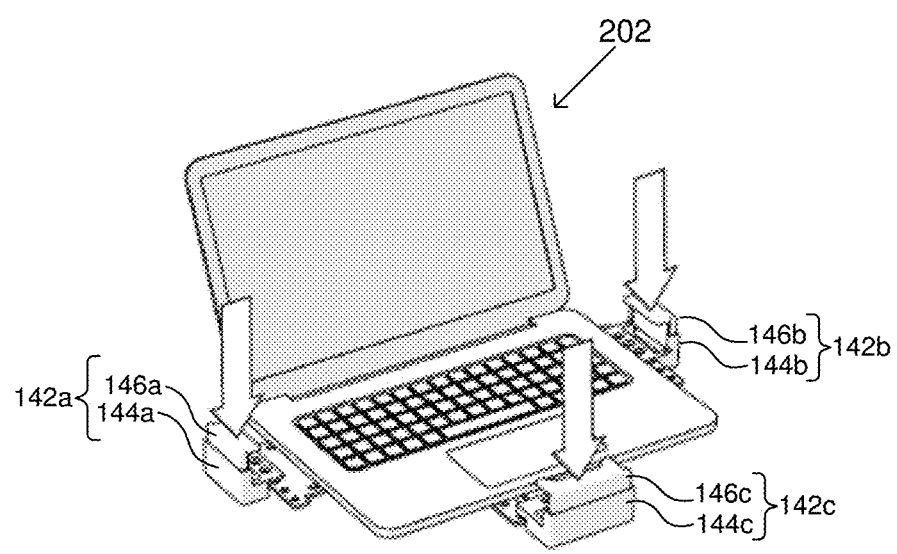
FIG. 5 illustrates how after being removed, adjustable clamp portions of the left, right, and front side braces can be replaced in respective bases of the side braces so that they can be used again to secure a laptop to the security mount.

FIG. 5 illustrates how after being removed, adjustable clamp portions 146 of the left, right, and front side braces 142 can be replaced in respective bases 144 of the side braces 142 so that they can be used again to secure a laptop, e.g., 202, to the security mount 102. In this manner, the adjustable embodiments of the side braces 142 can be used with laptops of various different thicknesses (and more specifically, with laptops having lower bodies 212 of various different thicknesses). As noted above, in certain embodiments, the side braces 142 are adjustable so they can be used with various different laptops having a wide range of thicknesses. The side braces 142 that are adjustable include a base 144 and an adjustable clamp portion 146. Each base 144 is attachable, e.g., via threaded screws, to a brace support 124 of one of the arms 122. Each base 144 includes an opening into which an adjustable clamp portion 146 can be inserted and pushed downward within.

Figure 6A:
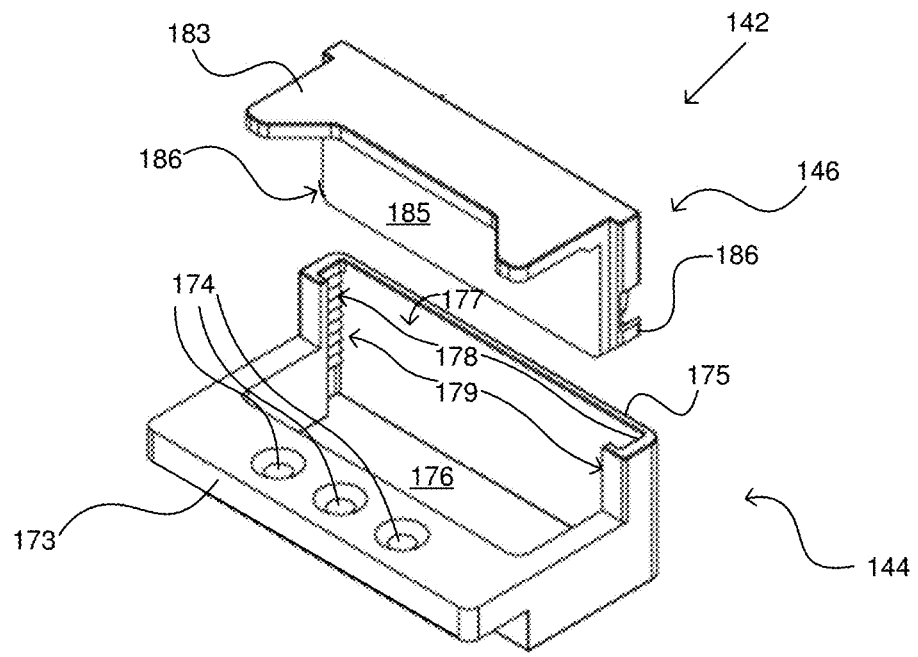
FIG. 6A is a perspective view of an adjustable side brace according to an embodiment of the present technology.

Additional details an adjustable type of side brace 142, according to certain embodiments of the present technology, will now be described with reference to FIGS. 6A, 6B, and 6C, which can be referred to collectively as FIG. 6. FIG. 6A is a perspective view of a side brace 142, which includes a base 144 and an adjustable clamp portion 146. The base 144 includes a lip 173 having through-holes 174 that are used to attach the base 144 to one of the brace supports 124 of one of the arms 122 using fasteners (e.g. threaded screws). The base 144 also includes a vertical wall 175 and an opening 176 between the vertical wall 175 and the lip 173. A portion of the opening 176 adjacent to the vertical wall 175 provides a channel 177 for accepting and engaging a vertical wall 185 of the adjustable clamp portion 146. Opposing inner walls 178 of the channel 177 include teeth 179 that collectively provide a sawtooth profile on each of the opposing inner walls 172.

The adjustable clamp portion 146 includes the vertical wall 185 and a flange 183 that extends perpendicular therefrom. The flange 183 is used to clamp a portion of a lower body (e.g., 212) of a laptop (e.g., 202) between the adjustable clamp portion 146 and the base 144 of the side brace 142. The vertical wall 185 is insertable into the channel 177 of the base 144. Distal ends of a leaf spring 186 extend outward from opposing sides of the vertical wall 185 of the adjustable clamp portion 146. The distal ends of the leaf spring 186 engage with the sawtooth profile provided by the teeth 179 that extend from the opposing inner walls 178 of the channel 177. The leaf spring 186 and the teeth 179 engage with one another to allow the adjustable clamp portion 146 to be pushed downward into the opening 176, but prevent the adjustable clamp portion 146 from being pushed upward. Thus, the only way to remove the adjustable clamp portion 146 from the base 144, once they are engaged with one another, is to push the adjustable clamp portion 146 all the way through the opening 176 as explained above with reference to FIG. 4, and specifically shown in FIG. 4C. Thus, it can be appreciated that a depth of the opening 176 in the base 144 should be slightly greater than the depth of the flange 183 of the adjustable clamp portion.

Figure 6B:
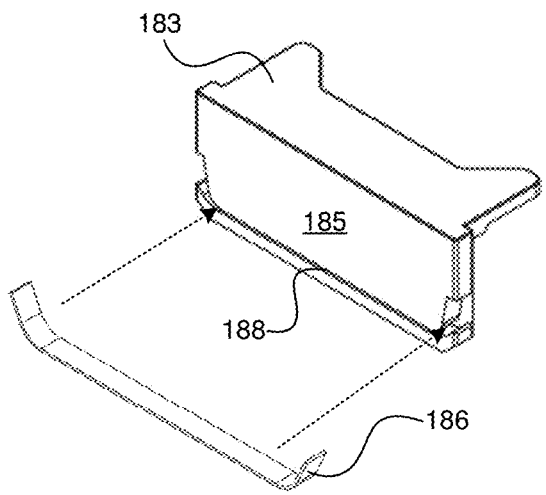
FIG. 6B is a rear perspective view of the adjustable clamp portion of the adjustable side brace and is used to show how a leaf spring can provided therewith.
Figure 6C:
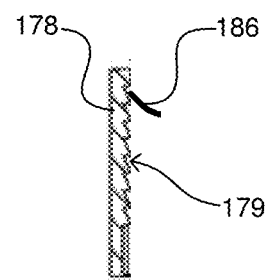
FIG. 6C is a cross sectional view of a sawtooth profiled inner wall of a channel of the base of the adjustable side brace shown in FIG. 6A.

FIG. 6B shows that the leaf spring 186 can be inserted into a groove 188 in the backside of the vertical wall 185 of the adjustable clamp portion 146, such that distal ends of the leaf spring 186 extend outward from opposing sides of the vertical wall 185 of the adjustable clamp portion 146. FIG. 6C shows a cross section of the opposing inner walls 178 of the channel 177, thereby showing the teeth 179 that provide the sawtooth profile. FIG. 6C also illustrates how a distal end of the leaf spring 186 allows movement of the adjustable clamp portion 146 downward, but not upward.

Figure 7:
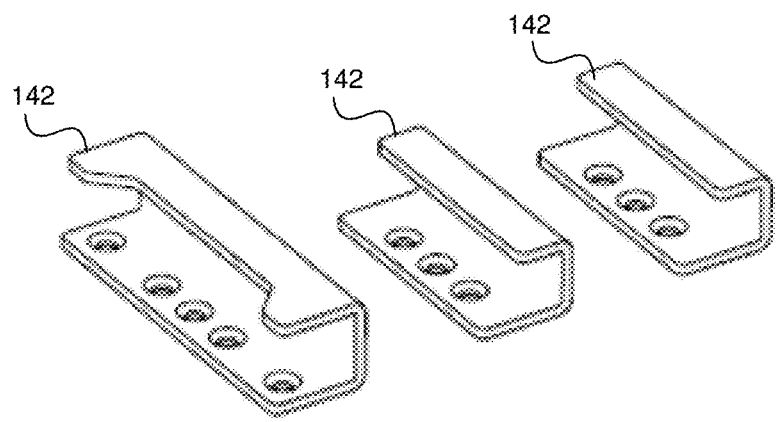
FIG. 7 are perspective views of three different exemplary side braces that are not adjustable.
Figure 8:
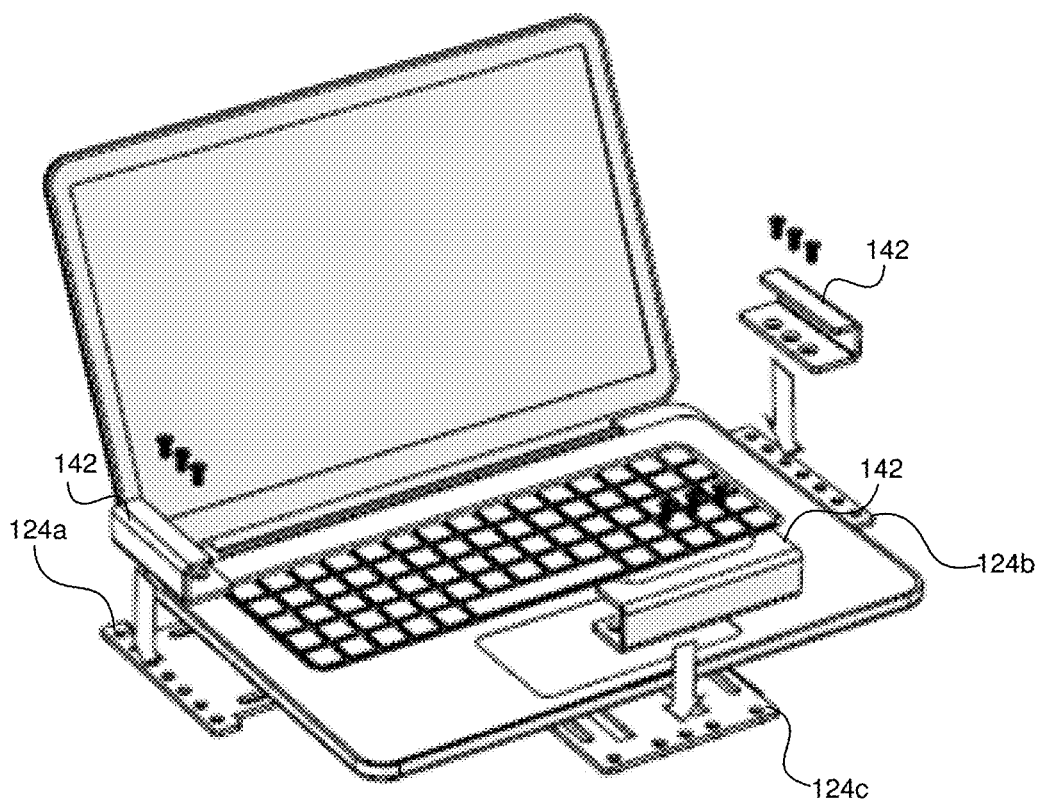
FIG. 8 illustrates how the non-adjustable side braces, examples of which are shown in FIG. 7, can be attached to brace supports of arms of the security mount.

As noted above, in alternative embodiments the side braces 142 are not adjustable and are configured for use with laptops having a relatively narrow range of thicknesses. FIG. 7 illustrates three different examples of side braces 142 that are not adjustable. FIG. 8 illustrates how the non-adjustable side braces, example of which are shown in FIG. 8, can be attached to brace supports 124 of arms 122 using fasteners (e.g., threaded screws). It is also possible for the mount 102 to have a combination of adjustable and non-adjustable side braces 142, e.g., the left and right side braces can be adjustable or the front side brace can have a fixed height, or the left and right side braces can each have a fixed height and the front side brace can be adjustable in height.

In the various embodiments described herein, threaded screws can be used to attach side braces 142 to arms 122, and more specifically, to the brace supports 124 of the arms 122. Other types of fasteners, besides threaded screws, can alternatively be used, such as rivets, or nuts and bolts, but are not limited thereto. Alternatively, or additionally, welding or brazing can be used to attach side braces 142 to arms 122. Other variations are also possible and within the scope of the embodiments described herein. It would also be possible that an arm and its respective side brace are integrally formed, e.g., from a blank that is bent to provide an arm portion and a side brace portion.

Figure 9:
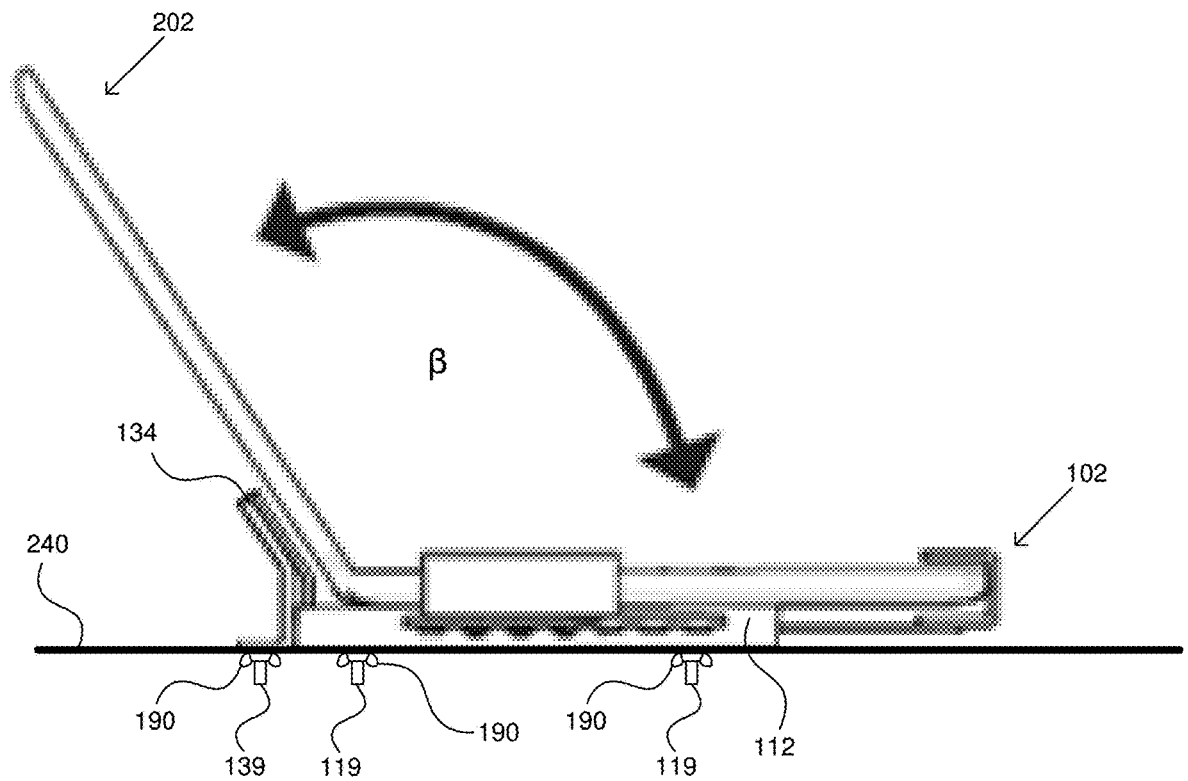
FIG. 9 shows how a security mount of an embodiment of the present technology can be secured to a tabletop of a display table.

FIG. 9, which includes a side view of the mount 102 and a laptop 202 secured to the mount 102, shows how the mount 102 can be secured to a tabletop 240 of a display table. More specifically, fasteners 119 that extend downward from the main body 112 of the mount 102, and fasteners 139 that extend downward from the back support 134 of the mount 102, can be inserted through respective through-holes in the tabletop 240. As can best be seen in FIG. 9, nuts 190 (e.g., wingnuts) and/or other fastener hardware can then be used to secure the main body 112 and back support 134 of the mount 102 to the tabletop 240 of a display table from the underside of the tabletop 240. Preferably, the underside of the tabletop 240 is made inaccessible to customers and potential thieves in a retail store, e.g., by being encased in a locked enclosure. This way potential thieves cannot remove the security mount 102 from the display table, and thus, could not steal the laptop 202 that is secured to the display table by the security mount 102.

Figure 11:
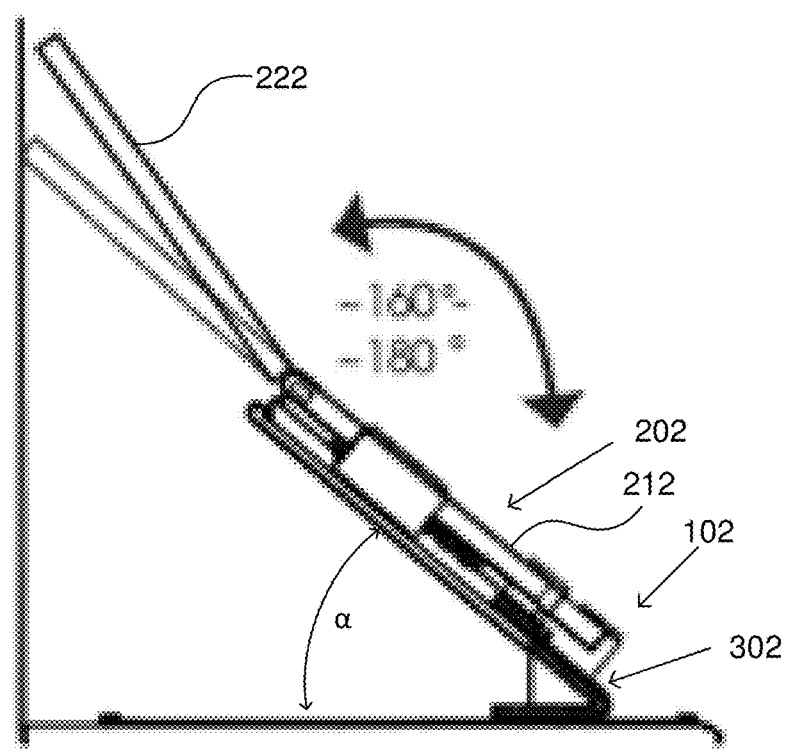

The security mounts of the embodiments of the present technology can be used to secure laptops to other display surfaces besides a horizontal display table. For example, such apparatuses can also be used to secure laptops to a vertical display wall, if desired, or more generally, to any one of various different types of display surfaces. For a more specifically example, referring to FIGS. 10 and 11, rather than directly attaching the mount 102 to a tabletop of a display table, a bracket 302 can be attached to a tabletop of a display table and the mount 102 can be secured to the bracket 302. As shown in FIGS. 10 and 11, the bracket 302 can be used to hold a lower body of the laptop at an acute angle α relative to a tabletop. In this case, the bracket 302 is designed for use with the mount 102, and thus, is configured to allow the mount 102 to be secured to the bracket 302. As could be appreciated from the above discussion, because of the adjustability of the security mount 102 it can beneficially be used with laptops of various different dimensions, including various different widths, depths, and thicknesses.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The disclosure has been described in conjunction with various embodiments. However, other variations and modifications to the disclosed embodiments can be understood and effected from a study of the drawings, the disclosure, and the appended claims, and such variations and modifications are to be interpreted as being encompassed by the appended claims. In the claims, the word "comprising" does not exclude other elements or steps, and the indefinite article "a" or "an" does not exclude a plurality.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, without additional context, use of numerical terms such as a "first" object, a "second" object, and a "third" object may not imply an ordering of objects, but may instead be used for identification purposes to identify different objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for physically securing a laptop in an open position to a tabletop of a display table or to another display surface, wherein the laptop includes a lower body portion including a keyboard and an upper body portion including a display screen and attached to the lower body portion by a hinge, the apparatus comprising:
    a main body having a top, a bottom, and walls that extend between the top and the bottom;
    a left arm, a right arm, and a front arm, each of which is extendable and retractable relative to the main body;
    a left side brace, a right side brace, and a front side brace, attached respectively to the left arm, the right arm, and the front arm, and configured to be secured to a left side, a right side, and a front side, respectively, of the lower body portion of the laptop to thereby secure the lower body portion of the laptop to the main body;
    a plurality of fasteners that extend downward from the bottom of the main body and are attachable to the tabletop of the display table or to the other display surface to thereby secure the laptop, which is secured to the main body, to the tabletop or to the other display surface; and
    a lock mechanism configured to automatically lock the left and the right arms in place after they have been at least partially retracted to thereby secure the lower body portion of the laptop to the main body;
    the lock mechanism also configured to allow a user to selectively release the left and the right arms to thereby enable the left and the right arms to be extended to thereby allow the lower body portion of the laptop to be unsecured from the main body; and
    the lock mechanism is inaccessible while the main body is attached to the tabletop or to the other display surface using the plurality of fasteners that extend downward from the bottom of the main body, thereby preventing someone from releasing the left and the right arms after the left and the right arms have been at least partially retracted to secure the lower body portion of the laptop to the main body, and thereby preventing someone from removing the laptop from the main body after the lower body portion of the laptop has been secured to the main body and the lock mechanism has locked the left and the right arms in place.

2. The apparatus of claim 1, further comprising:
    a gear within the main body and having teeth that intermesh with further teeth included on portions of the left and the right arms to thereby cause the left and the right arms to extend and retract relative to the main body in tandem.

3. The apparatus of claim 1, wherein the lock mechanism is also configured to automatically lock the front arm in place after the front arm has been at least partially retracted, and to allow the user to selectively release the front arm to thereby also allow the front arm to be extended to thereby allow the lower body portion of the laptop to be unsecured from the main body.

4. The device of claim 1, wherein the bottom of the main body comprises a bottom cover plate including an opening through which the lock mechanism can be accessed by a user while the main body is not attached to the tabletop or to the other display surface using the plurality of fasteners that extend downward from the bottom of the main body.

5. An apparatus for physically securing a laptop in an open position to a tabletop of a display table or to another display surface, wherein the laptop includes a lower body portion including a keyboard and an upper body portion including a display screen and attached to the lower body portion by a hinge, the apparatus comprising:
- a main body having a top, a bottom, and walls that extend between the top and the bottom;
- a left arm, a right arm, and a front arm, each of which is extendable and retractable relative to the main body;
- a left side brace, a right side brace, and a front side brace, attached respectively to the left arm, the right arm, and the front arm, and configured to be secured to a left side, a right side, and a front side, respectively, of the lower body portion of the laptop to thereby secure the lower body portion of the laptop to the main body;
- a plurality of fasteners that extend downward from the bottom of the main body and are attachable to the tabletop of the display table or to the other display surface to thereby secure the laptop, which is secured to the main body, to the tabletop or to the other display surface; and
- a plurality of springs within the main body that are configured to bias the left and the right arms in fully extended positions.

6. The apparatus of claim 5, wherein at least one side brace, of the left, the right, and the front side braces, includes:
- a base configured to be attached to a brace support portion of one of the left, the right, and the front arms; and
- an adjustable clamp having a least portion of which is configured to be inserted into an opening in the base and pushed into the opening to adjust a height of the side brace to thereby enable the side brace to be secured to laptops of various different thicknesses.

7. The apparatus of claim 6, wherein the adjustable clamp of at least one side brace, of the left, the right, and the front side braces, is configured to allow a user to push the adjustable clamp further into the opening of the base without allowing the user to push the adjustable clamp upward relative to the base.

8. The apparatus of claim 7, wherein the adjustable clamp of the at least one side brace, of the left, the right, and the front side braces, includes a leaf spring having distal ends that engage with sawtooth profiles of inner walls of a channel within the base to thereby allow the user to push the adjustable clamp further into the opening of the base without allowing the user to push the adjustable clamp upward relative to the base.

9. The apparatus of claim 5, wherein at least one side brace, of the left, the right, and the front side braces, has a fixed height.

10. The apparatus of claim 5, wherein the plurality of springs are also configured to bias the front arm in a fully extended position.

11. An apparatus for physically securing a laptop in an open position to a tabletop of a display table or to another display surface, wherein the laptop includes a lower body portion including a keyboard and an upper body portion including a display screen and attached to the lower body portion by a hinge, the apparatus comprising:
- a main body having a top, a bottom, and walls that extend between the top and the bottom;
- a left arm, a right arm, and a front arm, each of which is extendable and retractable relative to the main body;
- a left side brace, a right side brace, and a front side brace, attached respectively to the left arm, the right arm, and the front arm, and configured to be secured to a left side, a right side, and a front side, respectively, of the lower body portion of the laptop to thereby secure the lower body portion of the laptop to the main body;
- a plurality of fasteners that extend downward from the bottom of the main body and are attachable to the tabletop of the display table or to the other display surface to thereby secure the laptop, which is secured to the main body, to the tabletop or to the other display surface; and
- a back support configured to be attached to a back one of the walls of the main body;
- the back support configured to allow the upper body portion of the laptop, whose lower body portion is secured to the main body, to be at an obtuse angle relative to the lower body portion of the laptop that is secured to the main body.

12. An apparatus for physically securing a laptop in an open position to a tabletop of a display table or to another display surface, wherein the laptop includes a lower body portion including a keyboard and an upper body portion including a display screen and attached to the lower body portion by a hinge, the apparatus comprising:
- a main body;
- a left arm, a right arm, and a front arm, each of which is extendable and retractable relative to the main body;
- a left side brace, a right side brace, and a front side brace, attached respectively to the left arm, the right arm, and the front arm, and configured to be secured to a left side, a right side, and a front side, respectively, of the lower body portion of the laptop to thereby secure the lower body portion of the laptop to the main body; and
- a lock mechanism including a spring and configured to automatically lock the left and the right arms in place after the left and the right arms have been at least partially retracted into the main body to secure the lower body portion of the laptop to the main body;
- the lock mechanism, which includes the spring, also configured to allow a user to release the left and the right arms to thereby enable the left and the right arms to be extended to allow the lower body portion of the laptop to be unsecured from the main body.

13. The apparatus of claim 12, wherein:
the lock mechanism is inaccessible while the main body is attached to the tabletop or to the other display surface, thereby preventing someone from unlocking the left and the right arms and removing the laptop from the main body after the lower body portion of the laptop has been secured to the main body and the lock mechanism has locked the left and the right arms in place.

14. The apparatus of claim 12, further comprising:
a plurality of further springs configured to bias the left and the right arms in their fully extended positions.

15. The apparatus of claim 14, wherein energy stored by the further springs will cause the left and the right arms to automatically transition from at least partially retracted positions to their fully extended positions in response to the lock mechanism being transitioned from a lock position to a release position.

16. The apparatus of claim 14, wherein the further springs are also configured to bias the front arm in its fully extended position.

17. The apparatus of claim 12, further comprising:
a gear within the main body and having teeth that intermesh with further teeth included on portions of the left and the right arms to thereby cause the left and the right arms to extend and retract relative to the main body in tandem.

18. The apparatus of claim 12, wherein the locking mechanism including the spring is also configured to:

automatically lock the front arm in place after the front arm has been retracted into the main body to secure the lower body portion of the laptop to the main body; and allow the user to release the front arm to thereby enable the front arm to be extended to allow the lower body portion of the laptop to be unsecured from the main body.

19. An apparatus for physically securing a laptop in an open position to a tabletop of a display table or to another display surface, wherein the laptop includes a lower body portion including a keyboard and an upper body portion including a display screen and attached to the lower body portion by a hinge, the apparatus comprising:

a main body;

a left arm, a right arm, and a front arm, each of which is extendable and retractable relative to the main body; and a left side brace, a right side brace, and a front side brace, attached respectively to the left arm, the right arm, and the front arm, and configured to be secured to a left side, a right side, and a front side, respectively, of the lower body portion of the laptop to thereby secure the lower body portion of the laptop to the main body;

each side brace, of the left, the right, and the front side braces, including a respective base and a respective adjustable clamp;

each said base configured to be attached to a respective one of the left, the right, and the front arms; and each said adjustable clamp, of the left, the right, and the front side braces, having a least portion of which is configured to be inserted and pushed downward by a user into an opening in a respective said base to adjust a height of the side brace to thereby enable the side brace to be secured to laptops of various different thicknesses, while preventing the user from pushing the adjustable clamp upward relative to the base once the adjustable clamp has been inserted and pushed downward into the opening in the respective said base.

20. The apparatus of claim 19, wherein each said adjustable clamp includes leaf spring having distal ends that engage with sawtooth profiles of inner walls of a channel within the base to allow the user to push the adjustable clamp further into the opening of the base while preventing the user from pushing the adjustable clamp upward relative to the base.

21. The apparatus of claim 19, further comprising:

a plurality of fasteners that extend downward from the bottom of the main body and are attachable to the tabletop of the display table or to the other display surface to thereby secure the laptop, which is secured to the main body, to the tabletop or to the other display surface.

22. The apparatus of claim 19, further comprising:

a lock mechanism configured to selectively lock the left, the right, and the front arms in place after they have been at least partially retracted to secure the lower body portion of the laptop to the main body;

wherein the lock mechanism is also configured to allow a user to release the left, the right, and the front arms to thereby enable the arms to be extended to allow the lower body portion of the laptop to be unsecured from the main body; and wherein the lock mechanism is inaccessible when the main body is attached to the tabletop or to the other display surface.

* * * * *

UNITED STATES PATENT AND TRADEMARK OFFICE
CERTIFICATE OF CORRECTION

PATENT NO. : 11,122,917 B2  
APPLICATION NO. : 16/572296  
DATED : September 21, 2021  
INVENTOR(S) : Chapuis et al.

Page 1 of 1

It is certified that error appears in the above-identified patent and that said Letters Patent is hereby corrected as shown below:

In the Claims

Column 15, Line 27, (Claim 6): After "having" and before "portion" delete "a least" and insert -- at least a --.

Column 17, Line 30, (Claim 19): After "having" and before "portion" delete "a least" and insert -- at least a --.

Signed and Sealed this  
Seventh Day of June, 2022

Katherine Kelly Vidal  
*Director of the United States Patent and Trademark Office*